US008259546B2

(12) United States Patent
Yuzuki et al.

(10) Patent No.: US 8,259,546 B2
(45) Date of Patent: Sep. 4, 2012

(54) OPTICAL DISC DEVICE, TRACKING CONTROL START METHOD, AND TRACKING CONTROL START PROGRAM

(75) Inventors: Shinichi Yuzuki, Kanagawa (JP); Tadaomi Takeshita, Kanagawa (JP)

(73) Assignees: Sony Corporation, Tokyo (JP); Sony NEC Optiarc Inc., Tokyo (JP)

( * ) Notice: Subject to any disclaimer, the term of this patent is extended or adjusted under 35 U.S.C. 154(b) by 1241 days.

(21) Appl. No.: 11/924,213

(22) Filed: Oct. 25, 2007

(65) Prior Publication Data

US 2008/0186822 A1    Aug. 7, 2008

(30) Foreign Application Priority Data

Nov. 9, 2006   (JP) ................................. 2006-304328

(51) Int. Cl.
*G11B 7/095* (2006.01)
*G11B 7/13* (2012.01)
*G11B 7/135* (2012.01)

(52) U.S. Cl. ............... 369/53.14; 369/53.28; 369/44.32; 250/202

(58) Field of Classification Search ............... 369/53.14
See application file for complete search history.

(56) References Cited

U.S. PATENT DOCUMENTS

| 4,607,358 A * | 8/1986 | Maeda et al. ............. 369/44.28 |
| 4,745,587 A * | 5/1988 | Maeda et al. ............. 369/30.27 |
| 6,181,652 B1 * | 1/2001 | Katou et al. ............. 369/44.32 |
| 2006/0044962 A1 * | 3/2006 | Ishibashi et al. ........... 369/44.28 |

FOREIGN PATENT DOCUMENTS

| JP | 64-070931 | 3/1989 |
| JP | 03-171432 | 7/1991 |
| JP | 10-172155 | 6/1998 |
| JP | 10-320791 | 12/1998 |

OTHER PUBLICATIONS

Japanese Office Action issued on May 10, 2011, in Japanese Application No. 2006-304328.

* cited by examiner

*Primary Examiner* — Wayne Young
*Assistant Examiner* — Dionne Pendleton
(74) *Attorney, Agent, or Firm* — Oblon, Spivak, McClelland, Maier & Neustadt, L.L.P.

(57) ABSTRACT

The present invention can promptly start the tracking control. According to an embodiment of the present invention, after making it possible to discriminate the groove G and land L by the initial drive for the objective lens, the servo control and brake control are executed under an optimum condition when the objective lens is initially driven to the inner circumference direction to be outer eccentricity where a spot Pt is easily pulled in so as to pull in the spot Pt and start tracking control, and, in case the TR control error is raised when pulling in the spot Pt in an eccentricity speed minimum region AR1 for the first time, assuming that the eccentricity speed minimum region AR1 is inner eccentricity, the spot Pt is pulled in at the next eccentricity speed minimum region AR2 in which the eccentricity direction becomes opposite and the tracking control is started.

8 Claims, 17 Drawing Sheets

TRAVERSE SIGNAL OF CD SYSREM

TRAVERSE SIGNAL OF BD SYSTEM

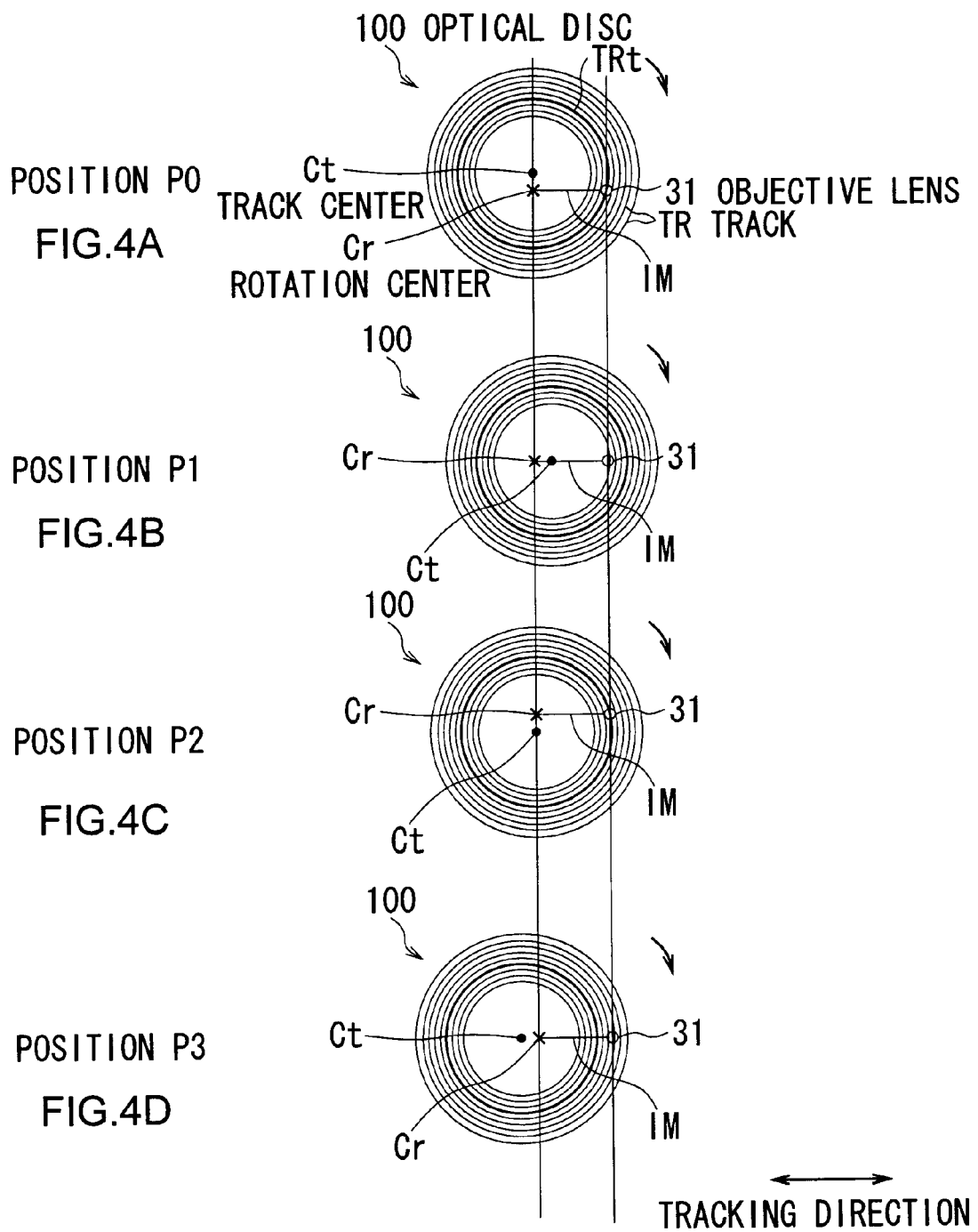

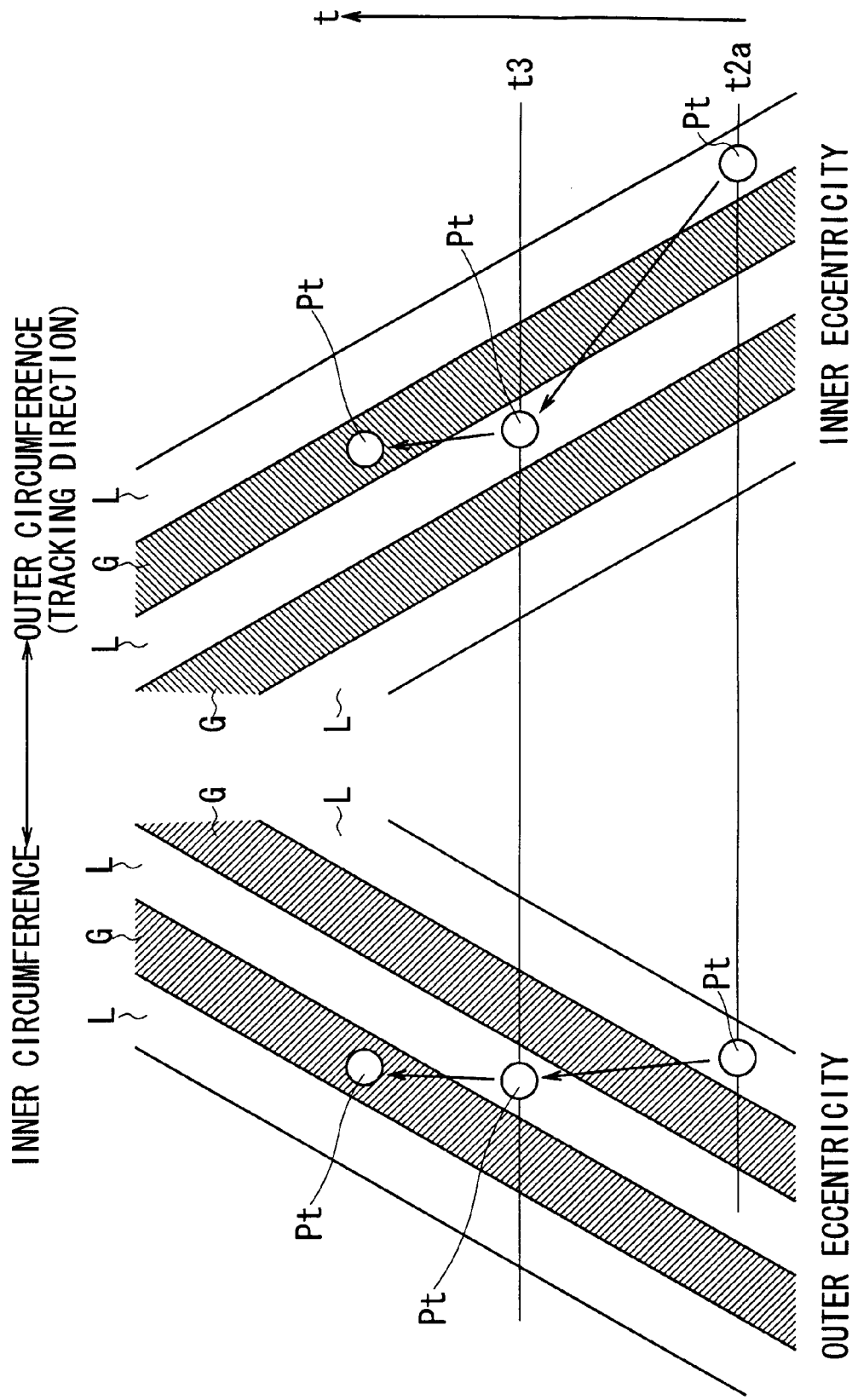

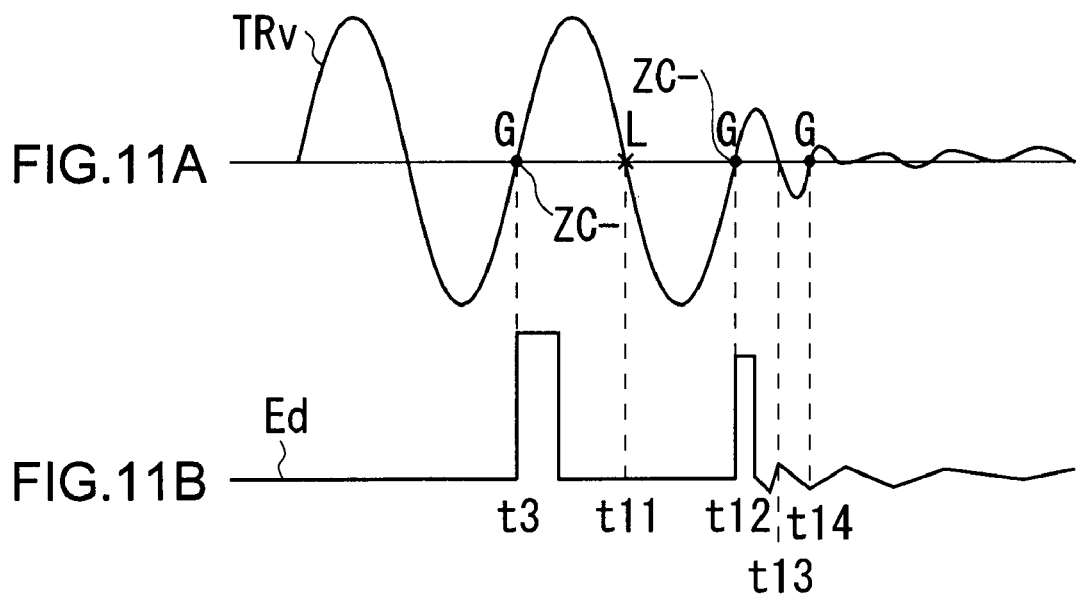
FIG.11A
FIG.11B
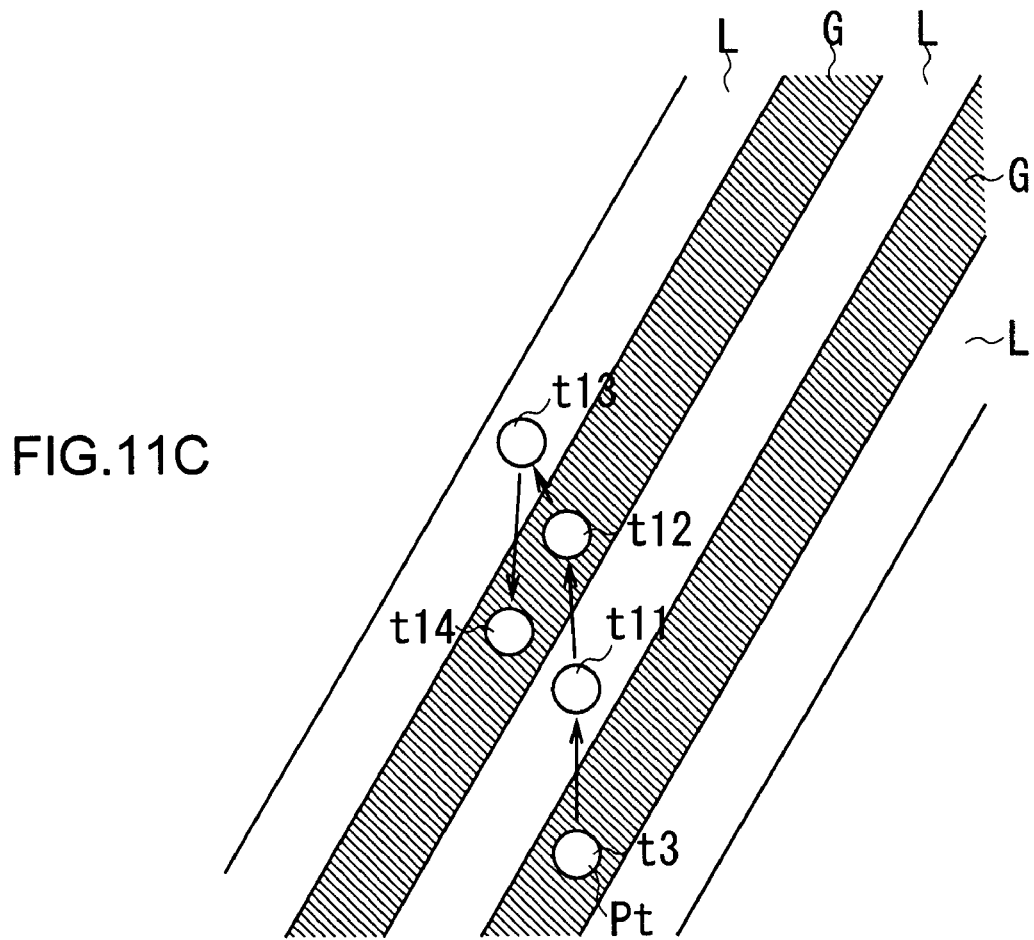
FIG.11C

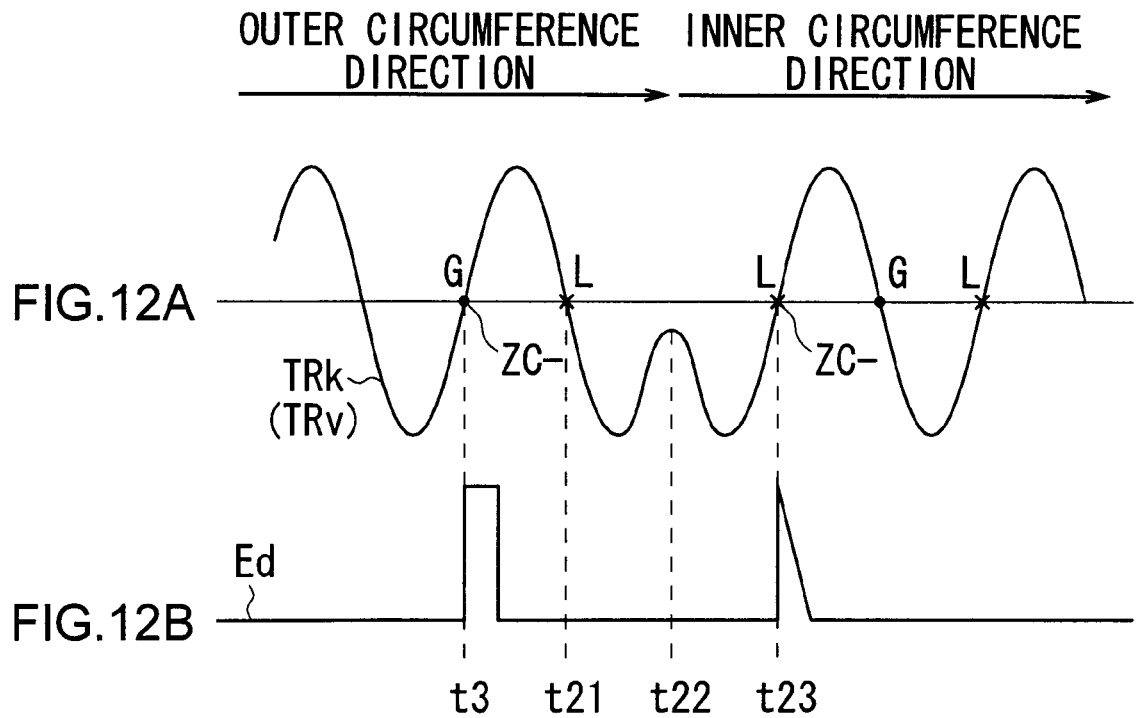
FIG.12A
FIG.12B
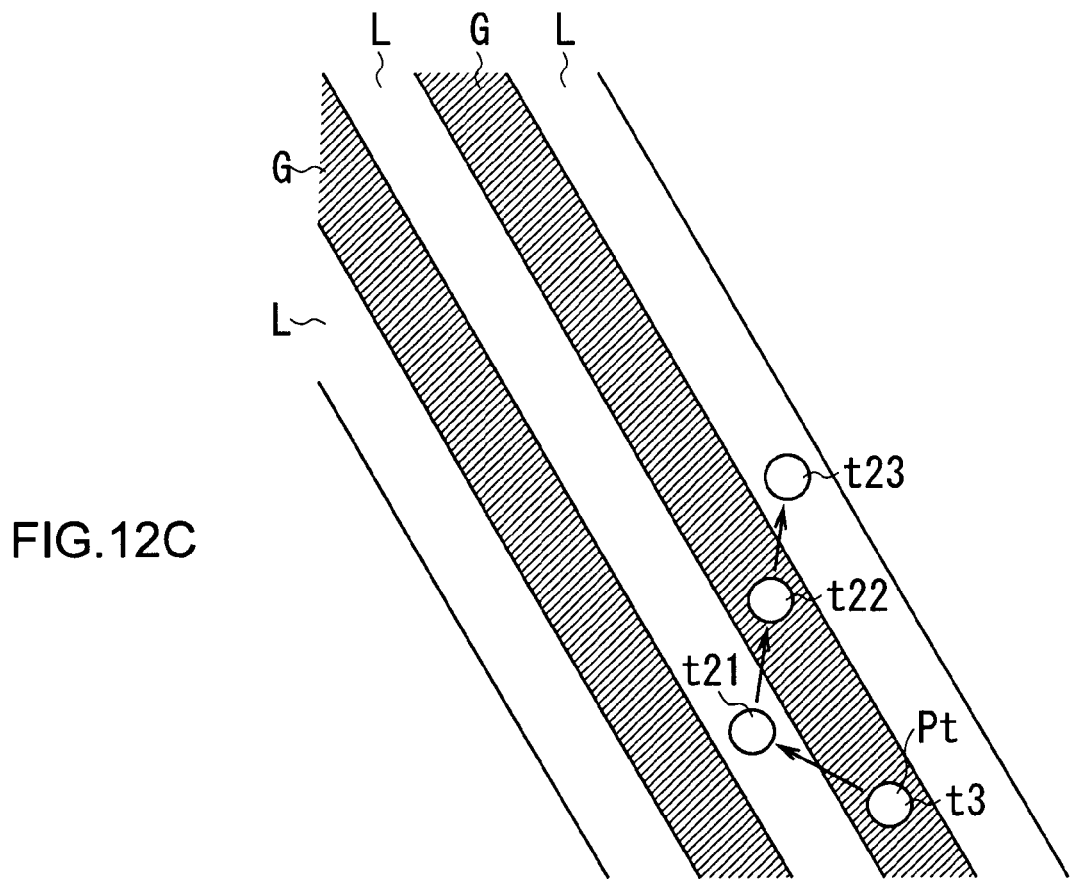
FIG.12C

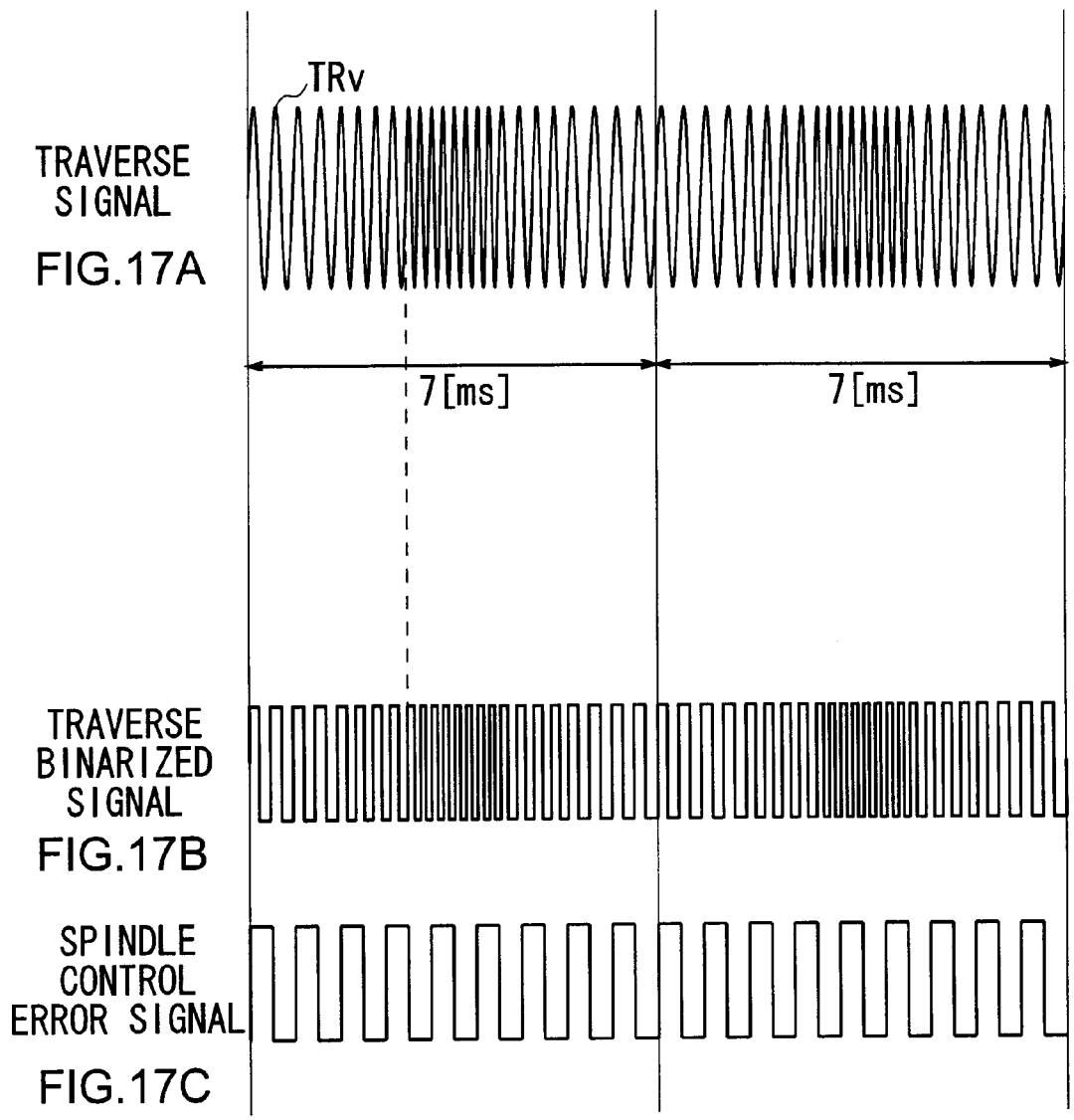

OPTICAL DISC DEVICE, TRACKING CONTROL START METHOD, AND TRACKING CONTROL START PROGRAM

CROSS REFERENCES TO RELATED APPLICATIONS

The present invention contains subject matter related to Japanese Patent Application JP2006-304328 filed in the Japanese Patent Office on Nov. 9, 2006, the entire contents of which being incorporated herein by reference.

BACKGROUND OF THE INVENTION

1. Field of the Invention

This invention relates to an optical disc device, a tracking control start method, and a tracking control start program which are desirably applied to an optical disc device corresponding to the Blu-ray Disc (BD) (registered trademark) system.

2. Description of the Related Art

In the past, in an optical disc device, by driving an objective lens under the tracking control based on a tracking error signal representing the deviance of an optical beam from the groove center, the optical beam is made to shift to the center of a groove on which recording marks are recorded. Among thus configured optical disc devices, there is an optical disc device in which, in the reproduction and record processing, after shifting the spot to a point near a desired groove, the spot of an optical beam is pulled onto the groove, and then the tracking control is started.

Among optical disc devices corresponding to a compact disc (CD) or a digital versatile disc (DVD) system, there is an optical disc device in which, in the reproduction and record processing, by determining the groove and land on an optical disc using a pull-in signal which utilizes the difference of the reflection factor of the groove and land being the guide groove, the spot is surely pulled in to the groove (for example, refer to Jpn. Pat. Appln. Laid-Open Publication No. 6-325518).

SUMMARY OF THE INVENTION

In an optical disc device, when shifting an objective lens in the radial direction of an optical disc, since an optical beam traverses tracks configured by grooves and lands, a periodical traverse signal is raised in a tracking error signal. In this traverse signal, the track pitch of an optical disc is directly brought about as the cycle period. FIG. 1A and FIG. 1B show examples of the traverse signal obtained from optical discs of the CD system and BD system, respectively.

In an optical disc device, when reproducing data of an optical disc of the BD system, since the track pitch of the optical disc of the BD system is extremely small as compared with that of the optical disc of the CD system, the spot applied to a groove is immediately shifted to a neighboring land, and it is desired that grooves and lands be correctly discriminated.

However, in an optical disc device, it is difficult to generate the above-described pull-in signal since the modulation factor of the groove and land is small in an optical disc of the BD system, so the groove and land are not discriminated.

Accordingly, in an optical disc device, there may be raised a case in which the spot is pulled in not onto the groove but onto the land, in which case the tracking control is not started normally, undesirably raising errors. Then, in an optical disc device, the processing is repeated in a random manner since the groove and land are not discriminated. Furthermore, in some cases, errors are repeated many times, which takes time before starting the tracking control, or makes the tracking control unstable, raising a problem that the tracking pull-in fails.

In view of the above-identified circumstances, it is therefore desirable to provide an optical disc device, a tracking control start method, and a tracking control start program which can promptly start the tracking control.

According to an embodiment of the present invention, there is provided an optical disc device that condenses an optical beam irradiated from a light source using an objective lens, and, when irradiating the optical beam to an optical disc as a spot, based on a tracking error signal representing the deviance amount of the spot from the track center of the optical disc, drives the objective lens such that the spot is shifted to a desired track using a tracking control unit, including: a minimum region detection unit that detects a first eccentricity speed minimum region in which the eccentricity speed with which the desired track departs from the objective lens comes to be minimum when the optical disc is rotated with the objective lens fixed, based on a cycle period of a traverse signal represented in the tracking error signal when the spot traverses the track due to the eccentricity of the optical disc; and a tracking control possibility determination unit that determines whether or not the control of the objective lens by the tracking control unit is normally executed, and, in case the control of the objective lens is not normally executed, makes the minimum region detection unit detect a second eccentricity speed minimum region having an eccentricity direction which is opposite to an eccentricity direction of the first eccentricity speed minimum region.

Accordingly, since the eccentricity directions of the first and second eccentricity speed minimum regions can be set opposite to each other, at the second operation of the tracking control unit, the possibility of normally starting the tracking control can be improved.

According to an embodiment of the present invention, there is also provided a tracking control start method with respect to an optical disc device that condenses an optical beam irradiated from a light source using an objective lens, and, when irradiating the optical beam to an optical disc as a spot, based on a tracking error signal representing the deviance amount of the spot from the track center of the optical disc, drives the objective lens such that the spot is shifted to a desired track using a tracking control unit, including the steps of: a minimum region detection step of detecting a first eccentricity speed minimum region in which the eccentricity speed with which the desired track departs from the objective lens comes to be minimum when the optical disc is rotated with the objective lens fixed, based on a cycle period of a traverse signal represented in the tracking error signal when the spot traverses the track due to the eccentricity of the optical disc; and a tracking control possibility determination step of determining whether or not the control of the objective lens by the tracking control unit is normally executed, and, in case the control of the objective lens is not normally executed, makes the minimum region detection unit detect a second eccentricity speed minimum region having an eccentricity direction which is opposite to an eccentricity direction of the first eccentricity speed minimum region.

Accordingly, since the eccentricity directions of the first and second eccentricity speed minimum regions can be set opposite to each other, at the second operation of the tracking control unit, the possibility of normally starting the tracking control can be improved.

According to an embodiment of the present invention, there is also provided a tracking control start program that makes a computer of an optical disc device that condenses an optical beam irradiated from a light source using an objective lens, and, when irradiating the optical beam to an optical disc as a spot, based on a tracking error signal representing the deviance amount of the spot from the track center of the optical disc, drives the objective lens such that the spot is shifted to a desired track using a tracking control unit execute the steps including: a minimum region detection step of detecting a first eccentricity speed minimum region in which the eccentricity speed with which the desired track departs from the objective lens comes to be minimum when the optical disc is rotated with the objective lens fixed, based on a cycle period of a traverse signal represented in the tracking error signal when the spot traverses the track due to the eccentricity of the optical disc; and a tracking control possibility determination step of determining whether or not the control of the objective lens by the tracking control unit is normally executed, and, in case the control of the objective lens is not normally executed, makes the minimum region detection unit detect a second eccentricity speed minimum region having an eccentricity direction which is opposite to an eccentricity direction of the first eccentricity speed minimum region.

Accordingly, since the eccentricity directions of the first and second eccentricity speed minimum regions can be set opposite to each other, at the second operation of the tracking control unit, the possibility of normally starting the tracking control can be improved.

According to the present invention, since the eccentricity directions of the first and second eccentricity speed minimum regions can be set opposite to each other, at the second operation of the tracking control unit, the possibility of normally starting the tracking control can be improved. Accordingly, it becomes possible to provide an optical disc device, a tracking control start method, and a tracking control start program which can promptly start the tracking control.

The nature, principle and utility of the invention will become more apparent from the following detailed description when read in conjunction with the accompanying drawings in which like parts are designated by like reference numerals or characters.

BRIEF DESCRIPTION OF THE DRAWINGS

In the accompanying drawings:

FIGS. 4A to 4D show schematic views indicative of the relationship between the eccentricity of an optical disc and an objective lens;

FIGS. 10A and 10B show schematic views to explain the relationship between the track and spot;

FIGS. 11A to 11C show schematic views to explain pulling in the spot in case of the outer eccentricity;

FIGS. 12A to 12C show schematic views to explain pulling in the spot in case of the inner eccentricity;

FIGS. 17A to 17C show schematic views indicative of the detection of the eccentricity speed minimum region in another embodiment.

DETAILED DESCRIPTION OF THE PREFERRED EMBODIMENTS

Now, an embodiment according to the present invention will be described in greater detail by referring to the accompanying drawings.

(1) Overall Configuration of an Optical Disc Device

Figure 2:
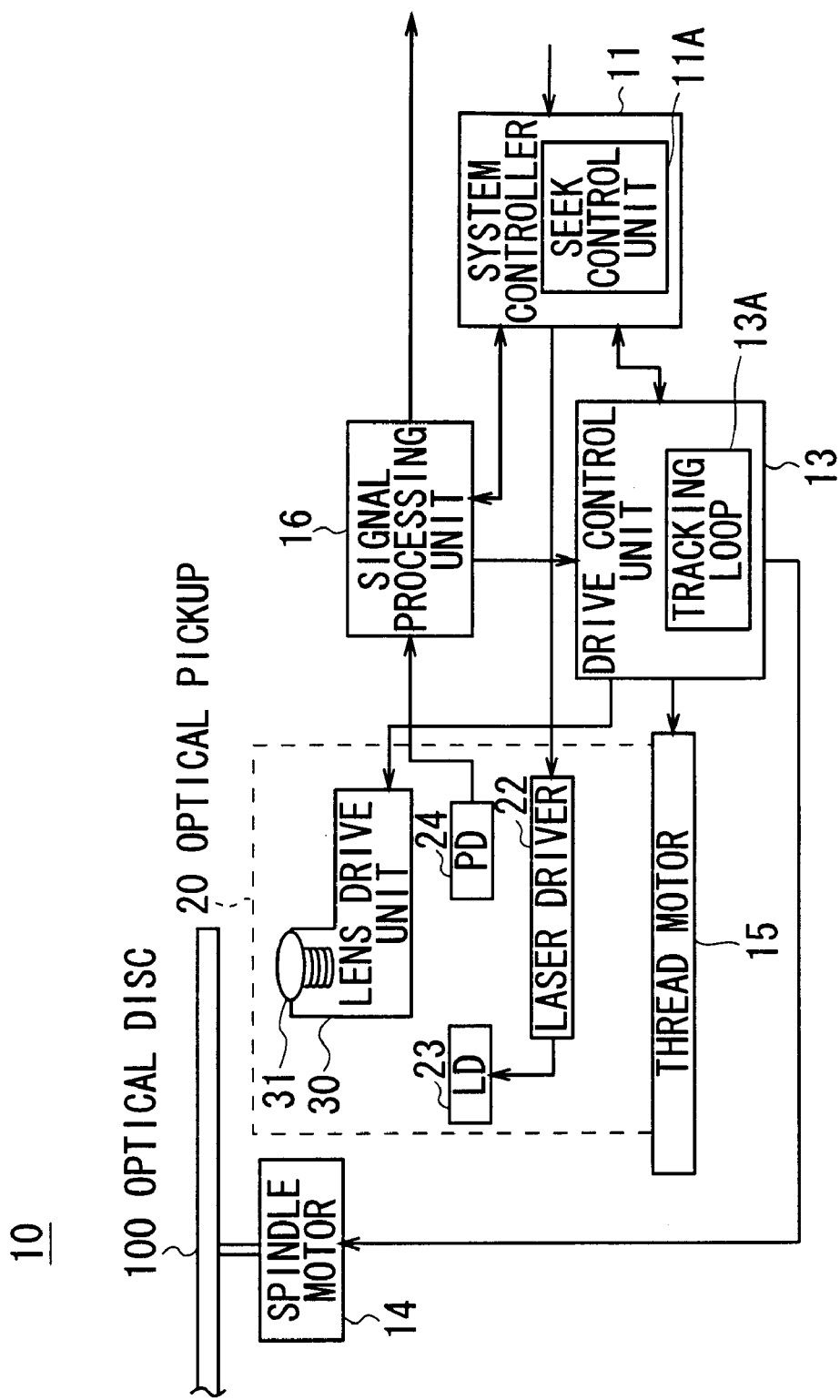
FIG. 2 shows a block diagram indicative of the entire configuration of an optical disc device.

In FIG. 2, a reference numeral "10" represents an optical disc device in this embodiment. The optical disc device 10 is controlled by a system controller 11 that is configured by a central processing unit (CPU), a read only memory (ROM), and a random access memory (RAM), which are not shown.

The system controller 11 expands a base program, a tracking control start program, etc. stored in the ROM on the RAM, and executes the reproduction processing, record processing, and tracking control start processing, to be described later, for an optical disc 100 of, for example, a Blu-ray disc (BD) (registered trademark) system based on these programs.

When executing the reproduction processing, the system controller 11 sends address information to specify data to be read out from the optical disc 100 and data readout command to a drive control unit 13.

The drive control unit 13 controls a spindle motor 14 to rotate the optical disc 100 with a predetermined rotational speed according to the data readout command sent from the system controller 11, and controls a thread motor 15 based on the data readout command and address information so as to shift an optical pickup 20 in the radial direction of the optical disc 100.

Then, the system controller 11 makes a laser diode 23 irradiate an optical beam of, for example, 405 nm to a track corresponding to address information in the information record layer of the optical disc 100 through a laser driver 22 in the optical pickup 20, and makes an objective lens 31 condense the optical beam to output thus condensed optical beam to the optical disc 100.

At this time, in the optical pickup 20, a photodiode 24 receives a reflected optical beam, which is brought about when the optical beam irradiated to the optical disc 100 is reflected thereby, and sends a received light signal according to the amount of light of the reflected optical beam to a signal processing unit 16. The signal processing unit 16 generates, based on the received light signal, a tracking error signal according to the deviance amount of the irradiation position of the optical beam with respect to a desired track, and a focus error signal according to the deviance amount of the focal point of the optical beam with respect to the information record layer of the optical disc 100, and sends these signals to drive control unit 13 and system controller 11, and generates a reproduction RF signal based on the received light signal to send thus generated reproduction RF signal to an external device, not shown.

A tracking loop 13A of the drive control unit 13 generates a tracking drive current and a focus drive current based on the tracking error signal and focus error signal respectively, and sends these currents to a lens drive unit 30. Accordingly, the lens drive unit 30 drives the objective lens 31 in two directions or the tracking direction which is the radial direction of the optical disc 100 and the focus direction which is a direction coming close to or getting away from the optical disc 100, to make the focal point of the optical beam accord with a desired track on the optical disc 100.

The system controller 11 generates a laser power signal based on the reproduction RF signal, and sends the laser power signal to the laser driver 22. The laser driver 22 generates a laser power control signal based on the laser power signal so as to control an optical beam to be irradiated such that the intensity thereof is set to a value suitable for the reproduction.

Furthermore, at the time of the record processing, the system controller 11 sends address information to assign part of the information record layer of the optical disc 100 to which data is to be recorded, and a data write command to the drive control unit 13.

Furthermore, the system controller 11 sends write data which is input from an external device etc., not shown, to the drive control unit 13. Moreover, the drive control unit 13 controls the position of the optical pickup 20 based on supplied address information.

Accordingly, the optical pickup 20 makes the focal point of an optical beam accord with a track of the information record layer of the optical disc 100 corresponding to address information, and, under the control of the laser driver 22, irradiates an optical beam whose intensity is adjusted to a value suitable for the data recording to record write data to the optical disc 100.

In this way, by irradiating an optical beam whose focal point is made to accord with a desired track of the information record layer of the optical disc 100 from the optical pickup 20, the optical disc device 10 records and reproduces data.

(2) Traverse Signal and Eccentricity of an Optical Disc (2-1) Traverse Signal

As described above, the optical disc device 10 drives the objective lens 31 using the tracking error signal such that the spot Pt of an optical beam comes to be located at the center of the groove (that is, the center of the track TR configured by the groove G and land L).

Figure 3A:
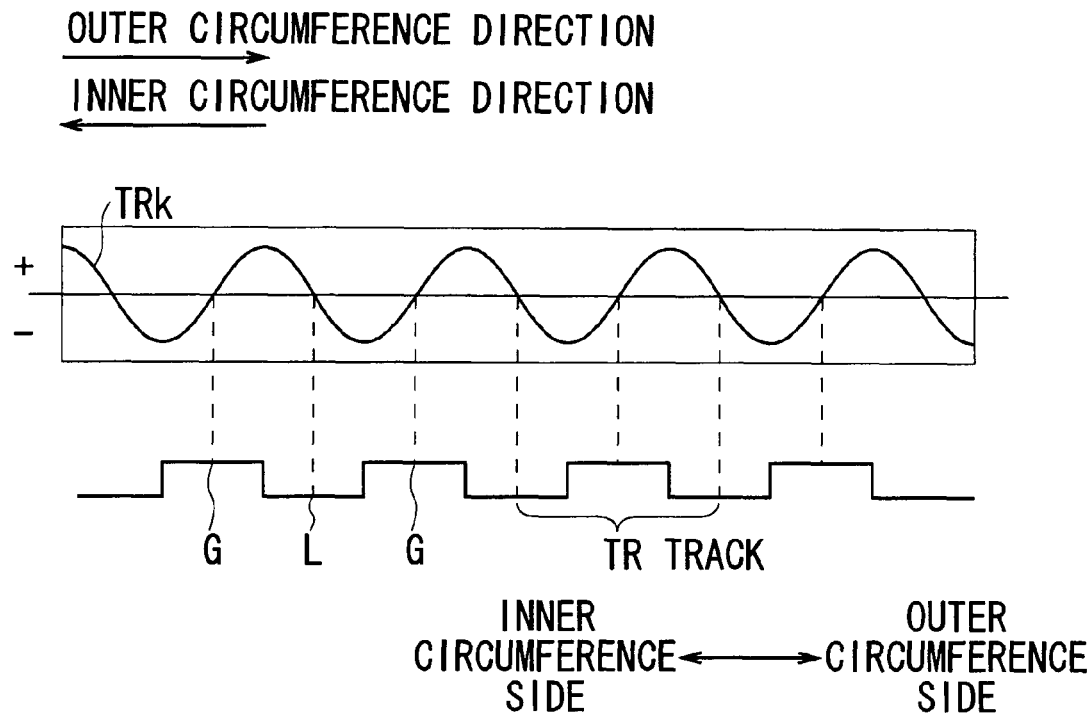
FIGS. 3A to 3C show schematic views indicative of the relationship between the traverse signals and groove and land.

As shown in FIG. 3A, a tracking error signal TRk comes to be zero when the spot Pt is located at the center of the groove G or land L, while comes to be maximum or minimum when the spot Pt is located at the boundary of the groove G and land L.

Figure 3B:
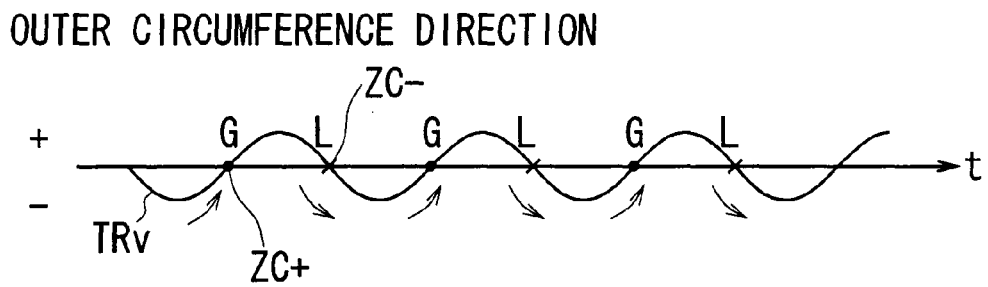
Figure 3C:
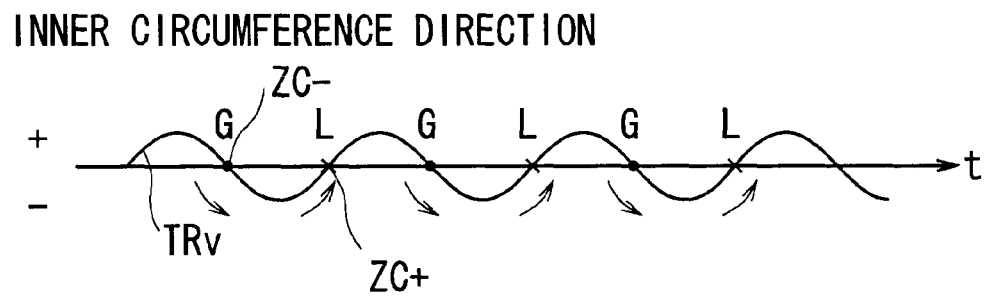

When the objective lens 31 is driven in the radial direction of the optical disc 100, as shown in FIG. 3B and FIG. 3C, the tracking error signal TRk expresses a waveform indicating that the spot Pt traverses tracks, and is generally referred to as a traverse signal TRv.

The traverse signal TRv has its phase difference with respect to the groove G and land L inverted when comparing two cases or a case in which the objective lens 31 is driven to the outer circumference direction (from the inner circumference side to the outer circumference side) of the optical disc 100, as shown in FIG. 3B, and a case in which the objective lens 31 is driven to the inner circumference direction (from the outer circumference side to the inner circumference side) of the optical disc 100, as shown in FIG. 3C.

That is, in the traverse signal TRv which is brought about when the objective lens 31 is driven to the outer circumference direction, the zero-cross point ZC+ when shifting from the minus side to the plus side represents the groove G, while in the traverse signal TRv which is brought about when the objective lens 31 is driven to the inner circumference direction, the zero-cross point ZC− when shifting from the plus side to the minus side represents the groove G.

Accordingly, in the optical disc device 10, after discriminating the signal change state of the traverse signal TRv (shifting to the plus side or shifting to the minus side), by detecting the zero-cross point ZC, it can be considered that whether the spot Pt is located on the groove G or on the land L can be determined according to the drive direction of the objective lens 31.

(2-2) Eccentricity of an Optical Disc

The optical disc 100 is provided with an eccentricity, that is, the track center Ct which is the center of the tracks TR of the optical disc 100 deviates from the rotation center Cr which is the center when the optical disc 100 rotates.

As shown in FIG. 4A to FIG. 4C, in the optical disc device 10, when the optical disc 100 is made to rotate with the objective lens 31 fixed, according to the positional relationship between the objective lens 31 and the track center Ct, the distance between the objective lens 31 and a desired track (referred to as target track TRt, hereinafter) is changed.

That is, the distance between the objective lens 31 and the target track TRt comes to be zero at a position P0 shown in FIG. 4A, in which state the track center Ct exists at a position perpendicular to a virtual line IM connecting the rotation center Cr and the objective lens 31 which is parallel with the tracking direction, while comes to be maximum in the outer circumference side direction at a position P1 shown in FIG. 4B, in which state the track center Ct exists on the virtual line IM.

Furthermore, the track eccentricity deviance amount Aba comes to be zero again at a position P2 shown in FIG. 4C, in which state the track center Ct exists at a position perpendicular to the virtual line IM, while comes to be maximum in the inner circumference side direction at a position P3 shown in FIG. 4D, in which state the track center Ct exists on the extended line of the virtual line IM.

Figure 5:
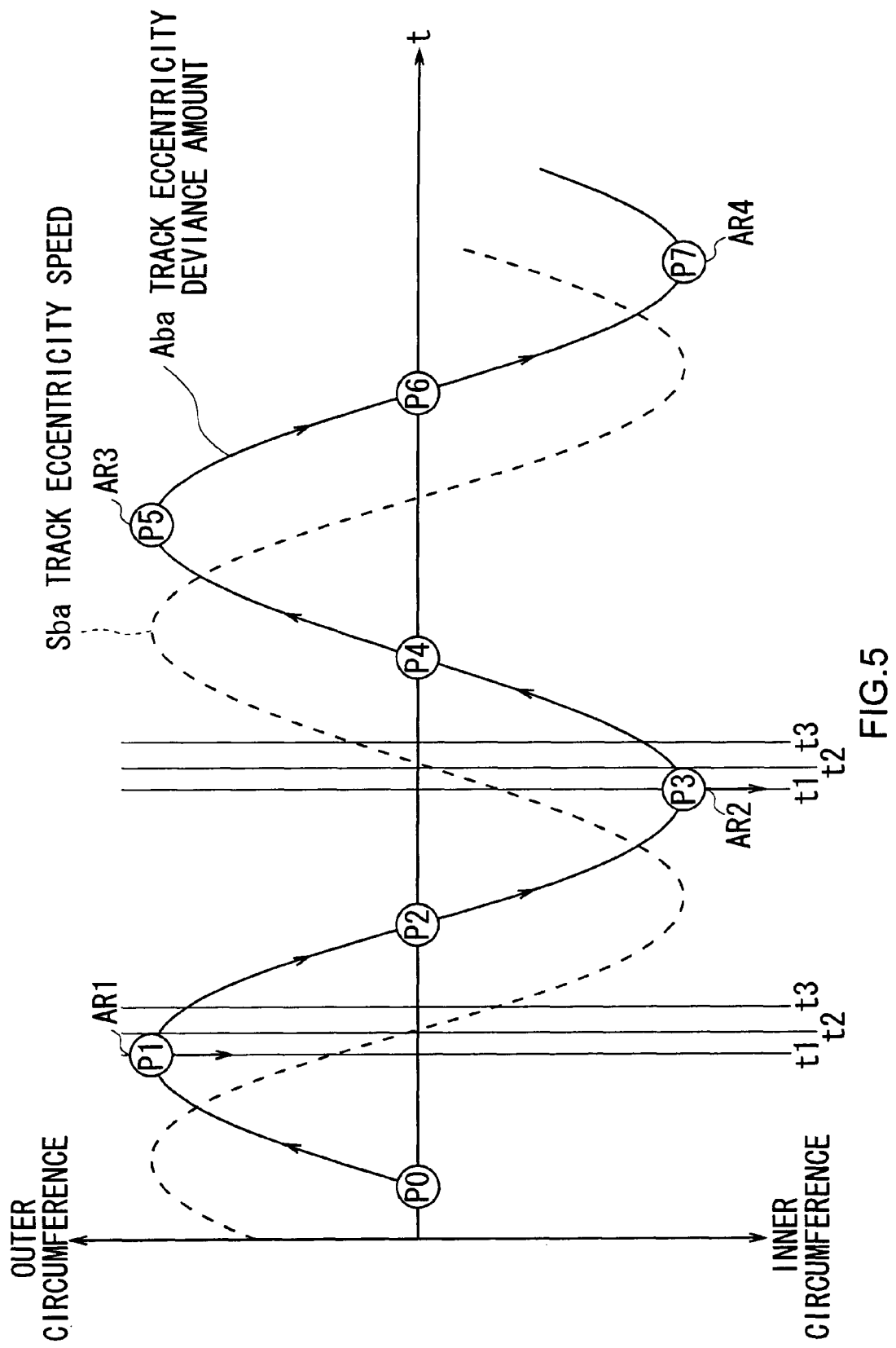
FIG. 5 shows a schematic view indicative of the track eccentricity deviance amount and track eccentricity speed.

FIG. 5 shows the change of the track eccentricity deviance amount Aba representing the distance between the spot Pt and the target track TRt with respect to time "t" with the objective lens 31 fixed similar to FIG. 4A to FIG. 4C. As shown in FIG. 5, the track eccentricity deviance amount Aba is represented as a sinusoidal wave, and it can be seen that track eccentricity deviance amount Aba comes to be maximum in the outer circumference side direction at the position P1, while comes to be maximum in the inner circumference side direction at the position P3. Positions P4, P5, P6, P7 show the states when the optical disc 100 is further made to rotate, and correspond to the positions P0, P1, P2 and P3, respectively.

Furthermore, the speed of change of the track eccentricity deviance amount Aba (referred to as track eccentricity speed Sba, hereinafter) is shown in a dotted line. It can be seen that the curve of the track eccentricity speed Sba is deviated from the curve of the track eccentricity deviance amount Aba by 90° in phase, and the track eccentricity speed Sba comes to be minimum at the positions P1 and P3 where the track eccentricity deviance amount Aba comes to be maximum, while the track eccentricity speed Sba comes to be maximum at the positions P0 and P2 where the track eccentricity deviance amount Aba comes to be minimum.

Figure 1A:
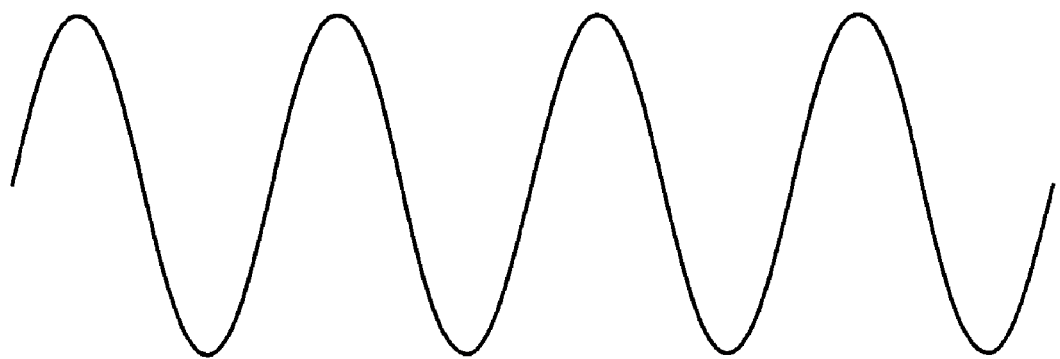
FIGS. 1A and 1B show schematic views indicative of traverse signals of a CD system and a BD system.
Figure 1B:
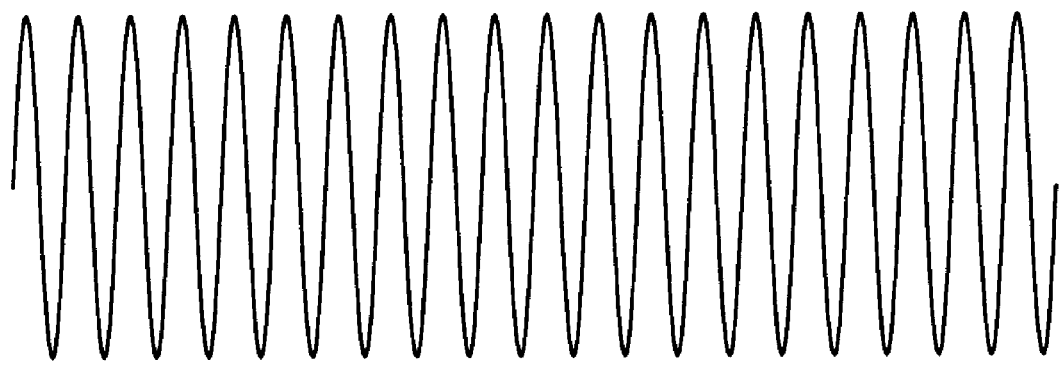

Furthermore, at this time, since the track eccentricity deviance amount Aba is much larger than the track pitch (approximately 0.32 μm), the spot Pt comes to traverse tracks TR, and, in this case also, the above-described traverse signal TRv shown in FIG. 1B is raised in the tracking error signal TRk.

Figure 6:
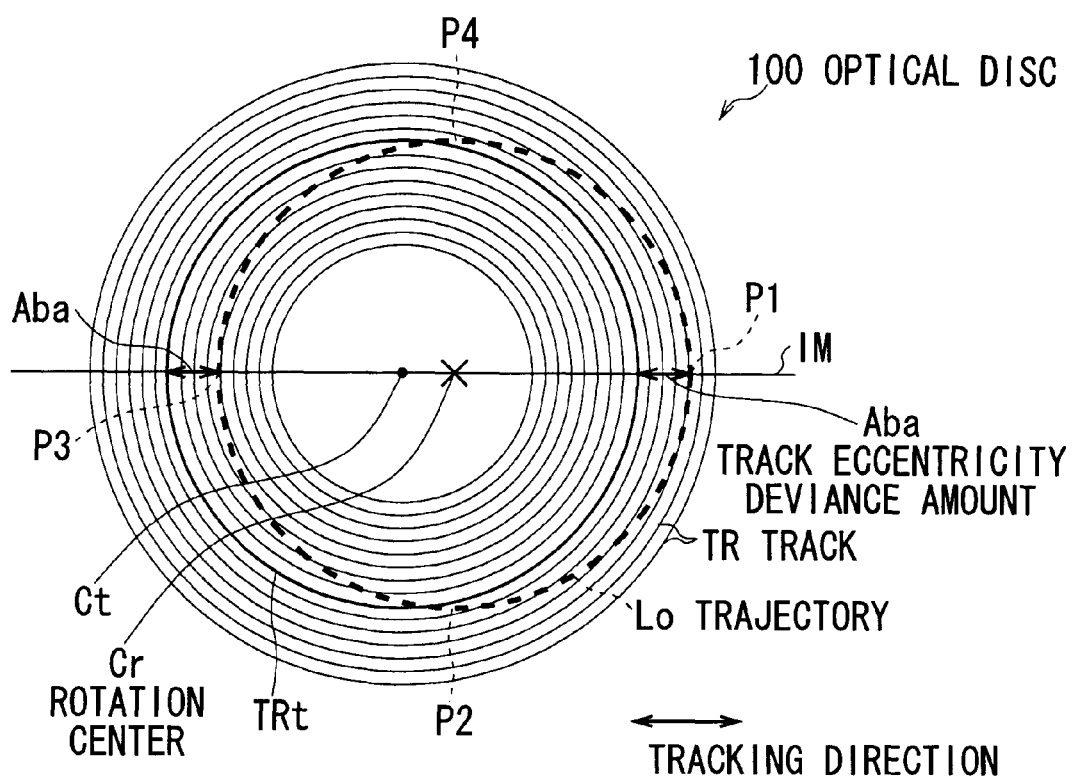
FIG. 6 shows a schematic view to explain the trajectory of an objective lens.

FIG. 6 shows a trajectory Lo of the spot Pt with respect to the optical disc 100, and it can be seen that the spot Pt traverses a number of tracks TR while the optical disc 100 rotates by one circle. Actually, since the track pitch is much smaller than that shown in FIG. 6, the spot Pt comes to traverse tracks TR much larger in number than those shown in FIG. 6.

Figure 7:
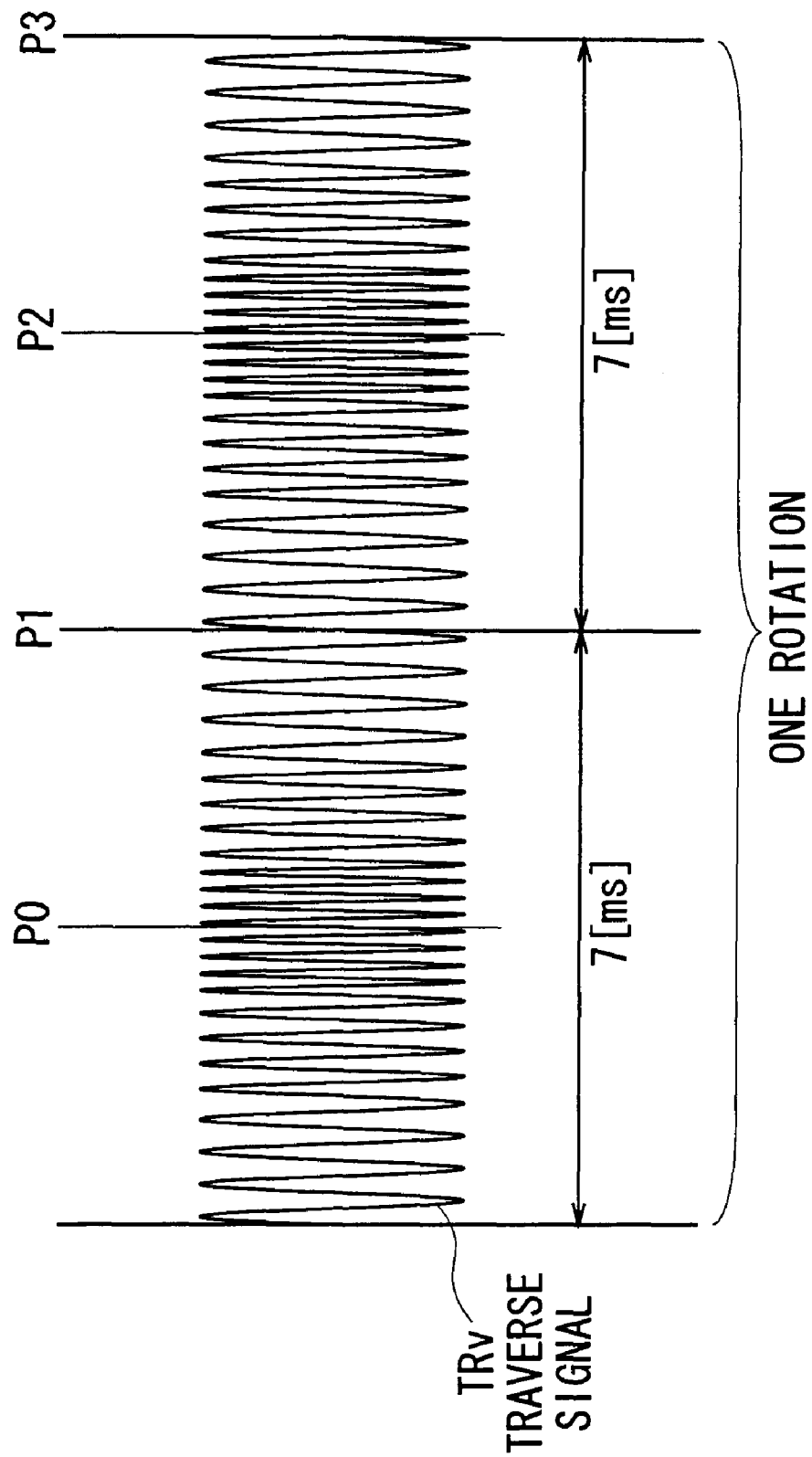
FIG. 7 shows a schematic view to explain the frequency of the traverse signal due to the eccentricity.

FIG. 7 shows the traverse signal TRv which is generated due to the eccentricity of the optical disc 100. Actually, since the optical disc device 10 makes the optical disc 100 of the BD system rotate with a time period of approximately 14 ms for one rotation in the reproduction processing at the innermost circumference under the double speed, the optical disc 100 is made to rotate by approximately 70 rotations for one second.

In case the optical disc device 10 applies a spot to the optical disc 100 of the track eccentricity deviance amount Aba with the objective lens 31 fixed in the tracking direction, since the spot comes to traverse tracks of (track eccentricity deviance amount Aba)/(0.32 μm) in number during ½ rotation, the traverse signal TRv of (track eccentricity deviance amount Aba)/(0.32 μm) in number can be seen for approximately 7 ms. The cycle period of the traverse signal TRv comes to be significantly large at around the positions P0, P2 where the track eccentricity speed Sba comes to be maximum.

(2-3) Track Eccentricity Deviance Amount and Traverse Signal

Next, an influence exerted on the traverse signal TRv by the above-described eccentricity will be explained.

Figure 8A:
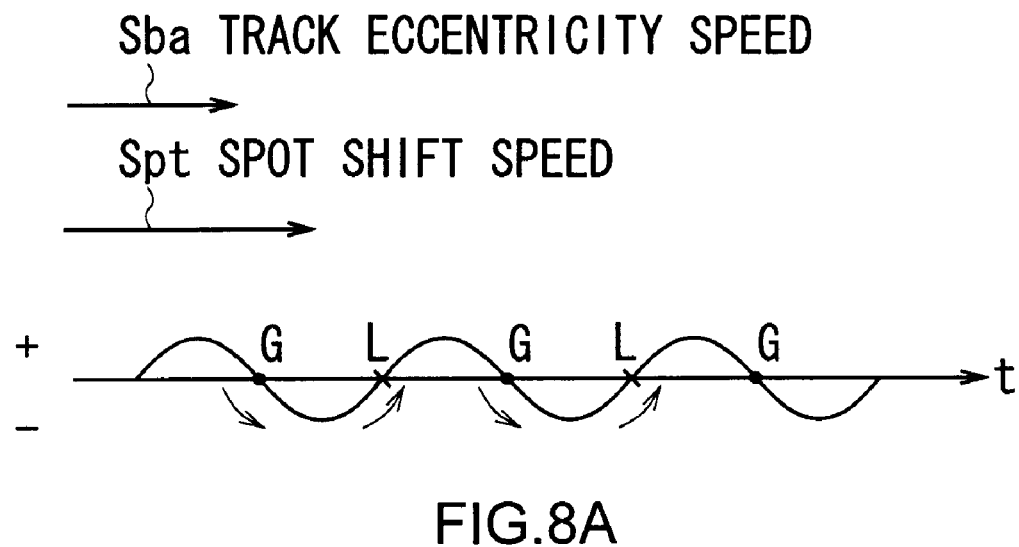
FIGS. 8A and 8B show schematic views indicative of the track eccentricity speed and the spot shift speed.

As shown in FIG. 8A, when the objective lens 31 is driven to the inner circumference direction, in case the shift speed of the spot Pt (referred to as spot shift speed, hereinafter) Spt is larger than the track eccentricity speed Sba which is brought about due to the eccentricity of the optical disc 100, since the spot Pt traverses the tracks TR toward the inner circumference direction of the optical disc 100, similar to the case shown in FIG. 3C, the zero-cross point ZC− when the traverse signal TRv shifts to the minus side represents the groove G, while the zero-cross point ZC+ when the traverse signal TRv shifts to the plus side represents the land L.

Figure 8B:
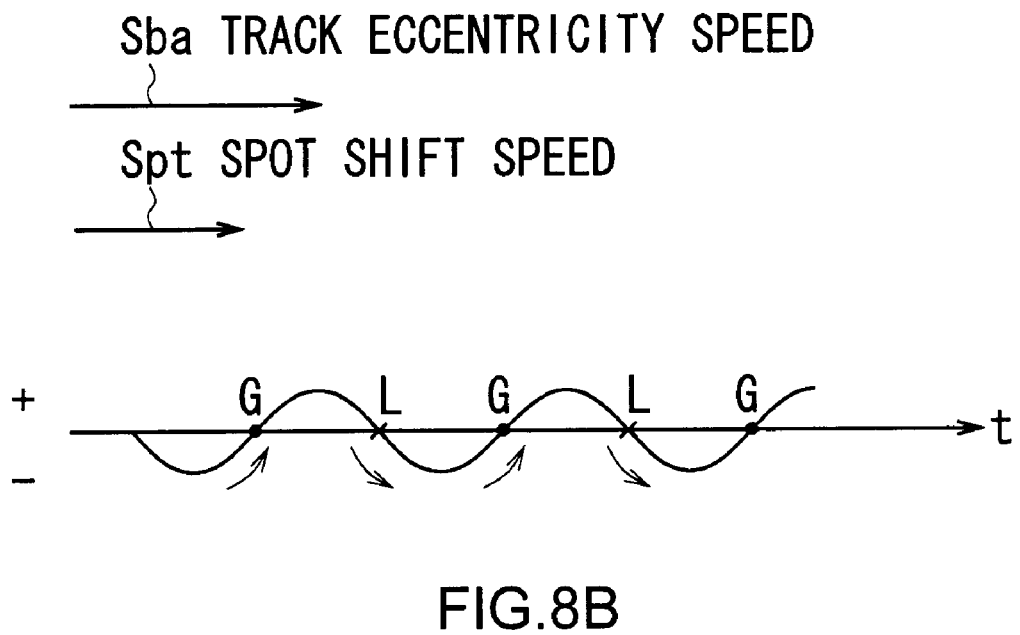

On the other hand, as shown in FIG. 8B, even if the objective lens 31 is similarly driven to the inner circumference direction, in case the spot shift speed Spt is smaller than the track eccentricity speed Sba, as the relative positional relationship between the tracks TR and the objective lens 31, since the spot Pt comes to traverse the tracks TR toward the outer circumference direction of the optical disc 100, opposite to the case shown in FIG. 3C, the zero-cross point ZC+represents the groove G, while the zero-cross point ZC− represents the land L.

Accordingly, when the optical disc 100 is provided with an eccentricity, the optical disc device 10 comes to be unable to discriminate the groove G and land L from the traverse signal TRv according to the drive direction of the objective lens 31.

Accordingly, as the tracking control start processing, by driving the objective lens 31 in a predetermined initial drive direction such that the spot shift speed Spt becomes sufficiently large and then reducing the speed, the optical disc device 10 carries out a predetermined speed servo control in the state shown in FIG. 8A, in which the spot shift speed Spt is larger than the track eccentricity speed Sba.

Accordingly, in the following processing, the optical disc device 10 can control such that the spot shift speed Spt is larger than the track eccentricity speed Sba, which makes it possible to discriminate the groove G and land L such that, in the traverse signal TRv shown in FIG. 7A, the zero-cross point ZC− represents the groove G, while the zero-cross point ZC+represents the land L.

(3) Tracking Control Start Processing

When a request to execute the reproduction and record processing is sent from the user, the system controller 11 of the optical disc device 10 performs the tracking control start processing for the tracks TR near the target track TRt.

The drive control unit 13 of the optical disc device 10 controls the spindle motor 14 to rotate the optical disc 100, and controls the thread motor 15 to shift the objective lens 31 to a point near the target track TRt.

Figure 9:
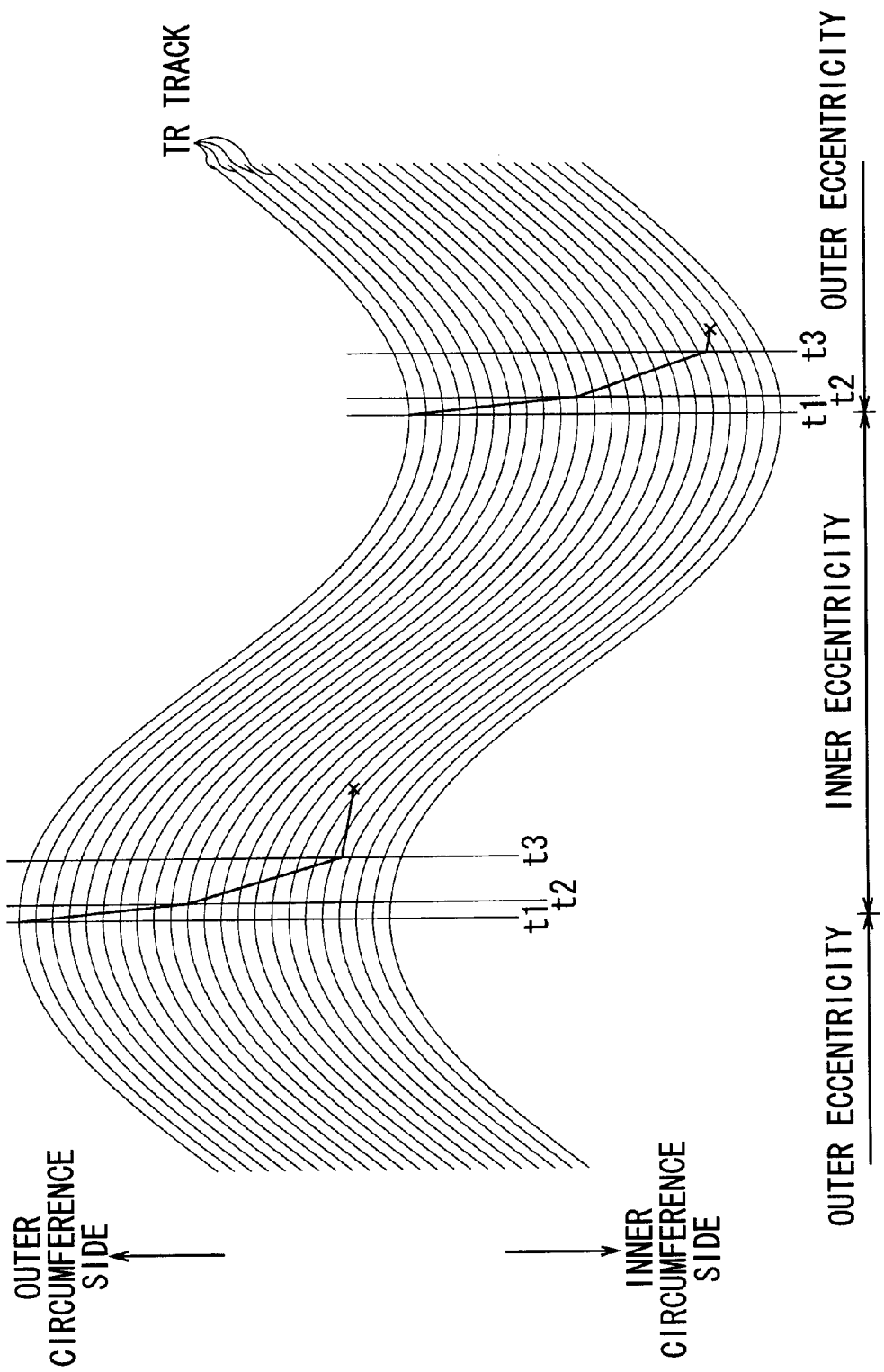
FIG. 9 shows a schematic view to explain the motion of a spot when pulling in the spot.

Similar to FIG. 5, in FIG. 9, respective curves represent the track eccentricity deviance amount Aba of the tracks TR, and to explain the motion of the spot Pt extending over the plural tracks TR, the plural tracks TR are so represented as to be adjacent to each other. In FIG. 9, a case in which the track eccentricity deviance amount Aba becomes large in the inner circumference side direction (referred to as inner eccentricity, hereinafter) and a case in which the track eccentricity deviance amount Aba becomes large in the outer circumference side direction (referred to as outer eccentricity, hereinafter) are shown to compare these two cases.

A seek control unit 11A of the system controller 11 detects positions where the spot Pt is located in a region AR where the track eccentricity speed Sba is minimum (referred to as eccentricity speed minimum region, hereinafter) from the traverse signal TRv. As shown in FIG. 5, the positions P1, P3, P5, and P7 come to be eccentricity speed minimum regions AR1, AR2, AR3, and AR4.

Specifically, the seek control unit 11A monitors the tracking error signal TRk generated by the signal processing unit 16, and detects the zero-cross points ZC± of the traverse signal TRv represented in the tracking error signal TRk, and measures the interval between the zero-cross points ZC± (referred to as zero-cross interval, hereinafter).

Then, the seek control unit 11A determines that the spot Pt is located in the eccentricity speed minimum region AR in case the zero-cross interval is equal to or more than a predetermined detection threshold value and the zero-cross interval which is equal to or more than the detection threshold value is detected by a predetermined number of times or more.

In this way, the seek control unit 11A prevents the case in which the zero-cross interval becomes large instantaneously since the zero-cross points ZC± are not detected due to some reasons from being determined as the eccentricity speed minimum region, and can detect only the case in which the spot Pt is surely located in the eccentricity speed minimum region AR.

When detecting that the spot Pt is located in the eccentricity speed minimum region AR, the seek control unit 11A supplies an initial drive signal KP to the drive control unit 13 from a time point t1 to a time point t2. By supplying a predetermined voltage to the lens drive unit 30 for a predetermined initial drive time period according to the initial drive signal KP, the drive control unit 13 drives the objective lens 31 in the inner circumference direction being a predetermined initial drive direction with a predetermined initial drive speed such that the spot shift speed Spt is larger than the maximum track eccentricity speed Sba which is assumed in the eccentricity speed minimum region AR by a target speed "a" to be described later or more.

At the time point t2 when the initial drive time period ends, by reducing the speed of the objective lens 31 driven with the initial drive speed, and adjusting the speed of the objective lens 31 for a predetermined track number such that the frequency of the traverse signal TRv comes to be the target speed "α", the seek control unit 11A executes the speed servo control for the objective lens 31.

At this time, since the seek control unit 11A executes the speed servo control from the state in which the spot Pt is shifted with the spot shift speed Spt which is larger than the track eccentricity speed Sba by the target speed "α", the spot shift speed Spt can be set higher than the track eccentricity speed Sba, as shown in FIG. 8A, and it can be determined that the zero-cross point ZC− is groove G, while the zero-cross point ZC+ is land L.

Furthermore, since the optical disc device 10 executes the speed servo control for the objective lens 31 so as to attain the target speed "α" which is larger than the frequency in the eccentricity speed minimum region AR of the optical disc 100 of the BD system, it can be prevented that the spot shift speed Spt becomes slower than the track eccentricity speed Sba and the relationships between the zero-cross points ZC± and the groove G and land L are inverted.

As shown in FIG. 10A, as a time period from a time point t2a to a time point t3 which represents the motion of the spot Pt for which the speed servo control is executed, in case the eccentricity direction of the tracks TR is outer eccentricity which is opposite to the initial drive direction, the tracks TR shift in a direction opposite to that of the spot Pt as the time "t" elapses, which is represented in the upper direction. Accordingly, the shift amount of the objective lens 31 when the traverse signal TRv comes to be the target speed "a" becomes small.

On the other hand, as shown in FIG. 10B, in case the eccentricity direction of the tracks TR is inner eccentricity which is equal to the initial drive direction, the tracks TR shift in a direction equal to that of the spot Pt as the time "t" elapses, and it is necessary to shift the spot Pt faster than the tracks TR. Accordingly, the shift amount of the objective lens 31 when the traverse signal TRv comes to be the target speed "a" becomes large as compared with the case of the outer eccentricity.

When a predetermined speed servo control is ended, as shown in FIG. 11A, the seek control unit 11A detects the next zero-cross point ZC− in the traverse signal TRv, and, setting the time point to the time point t3, supplies a brake signal BK in the outer circumference direction to the drive control unit 13. By applying a voltage whose polarity is opposite to the initial drive direction to a drive voltage Ed, shown in FIG. 11B, to be supplied to the lens drive unit 30, the drive control unit 13 reduces the speed of the objective lens 31.

Then, when detecting the zero-cross point ZC−, the seek control unit 11A sets the tracking loop 13A that executes the tracking control of the objective lens 31 based on the tracking error signal ON, and starts the tracking control.

At this time, since the seek control unit 11A reduces the speed of the objective lens 31 to make the spot shift speed Spt small, the track eccentricity speed Sba becomes larger than the spot shift speed Spt.

As shown in FIG. 10A, in case the eccentricity of the tracks TR is outer eccentricity which is opposite to the initial drive direction (for example, position P3), since the tracks TR shift in a direction opposite to that of the motion of the spot Pt, in the relative relationship between the tracks TR and the spot Pt, since the spot Pt keeps shifting in the inner circumference direction, the seek control unit 11A can locate the spot Pt on the groove G without problems by detecting the next zero-cross point ZC−.

That is, after recognizing that the spot Pt shifts to the land L at a time point t11, shown in FIG. 11A to FIG. 11C, the seek control unit 11A detects the zero-cross point ZC− again at the time point t12 when the spot Pt shifts to the next groove G, and sets the tracking loop 13A ON on the groove G.

The tracking loop 13A controls the drive voltage Ed such that the spot Pt located on the groove G stays on the groove G, and pulls back the spot Pt which is shifted to the land L at the time point t13, and shifts the spot Pt on the groove G at a time point t14.

In this way, in case the tracks TR are outer eccentricity, since the seek control unit 11A can correctly recognize the groove and land based on the traverse signal TRv, the spot Pt can be pulled in onto the groove G without problems, which can start tracking control correctly using a tracking loop 13B.

On the other hand, as shown in FIG. 10B, in case the tracks TR are inner eccentricity which is equal to the initial drive direction, the tracks TR shift in a direction equal to that of the motion of the spot Pt.

Accordingly, as shown in FIG. 12A to FIG. 12C, when the seek control unit 11A reduces the speed of the spot shift speed Spt at the time point t3, in the relative relationship between the tracks TR and the spot Pt, since the spot Pt shifts in the outer circumference direction (FIG. 8B), the phase is inverted with respect to the traverse signal TRv (FIG. 12A) between a time point t21 and a time point t22.

At this time, while detecting the zero-cross point ZC− to pull in the spot Pt onto the groove G, since the zero-cross point ZC− represents the land L in the state in which the phase is inverted, the seek control unit 11A pulls in the spot Pt onto the land L at a time point t23.

Then, at the time point t23, the seek control unit 11A sets the tracking loop 13A ON with the spot Pt located on the land L. As a result, while the tracking loop 13A starts the tracking control, the tracking error signal TRk is undesirably made divergent, which raises errors in the tracking control (referred to as TR control error, hereinafter).

In this way, in case the tracks TR are inner eccentricity (for example, position P1), the seek control unit 11A is not able to recognize the groove G and land L correctly due to the inversion of phase in the traverse signal TRv, and pulls in the spot Pt onto the land L, which is not able to start the tracking control correctly.

Accordingly, the seek control unit 11A monitors the tracking error signal TRk over a predetermined monitoring time period (for example, 1 ms) after the tracking loop 13A is set ON, and determines the existence of the TR control error promptly depending on whether or not the average value of the amplitude of the tracking error signal TRk exceeds a predetermined error threshold value, and in case it is determined that the TR control error is raised, the processing at the eccentricity speed minimum region AR1 where the current spot Pt is located is immediately stopped.

Then, the seek control unit 11A detects the next eccentricity speed minimum region AR2 (FIG. 5) whose eccentricity direction is opposite to that of the eccentricity speed minimum region AR1 where the spot Pt is located, and executes the processing from the time point t1 again in the next eccentricity speed minimum region AR2.

Accordingly, since the seek control unit 11A can execute the processing from the time point t1 again in the eccentricity speed minimum region AR2 (position P3) whose eccentricity direction is opposite to that of the initial drive direction, pulling in the spot Pt onto the groove G can be successfully performed surely in the second processing, which can promptly stop the tracking control start processing.

On the other hand, in case the seek control unit 11A determines that the TR control error is not raised, since the tracking control can be normally started, the tracking control start processing is ended.

In this way, in the optical disc device 10, in case the TR control error is raised in the eccentricity speed minimum region AR1 which is detected at the first time, by pulling in the spot Pt from the time point t1 at the next eccentricity speed minimum region AR2 again where the eccentricity direction is opposite, the tracking control can be surely started in pulling in the spot Pt at the second time, which can reduce the total time period necessary in performing the tracking control start processing.

Figure 13:
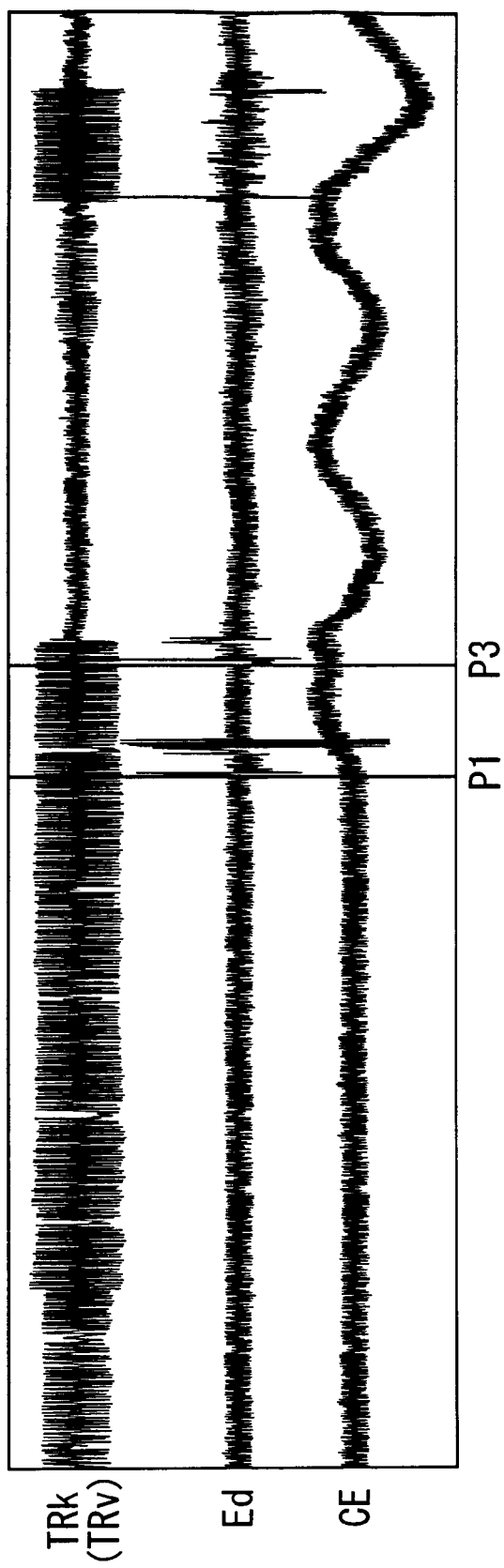
FIG. 13 shows a schematic view indicative of respective signals in the tracking control start processing.

FIG. 13 shows waveforms obtained when the tracking control start processing is actually executed. In FIG. 13, the TR control error is raised at the position P1 being the eccentricity speed minimum region AR1 of the first time, and the tracking control is normally started at the position P3 being the eccentricity speed minimum region AR2 of the second time. Since the tracking control is normally started after the position P3, it can be seen that the visual field error signal CE representing the shift amount of the objective lens 31 from the reference position fluctuates according to the eccentricity of the tracks.

Figure 14:
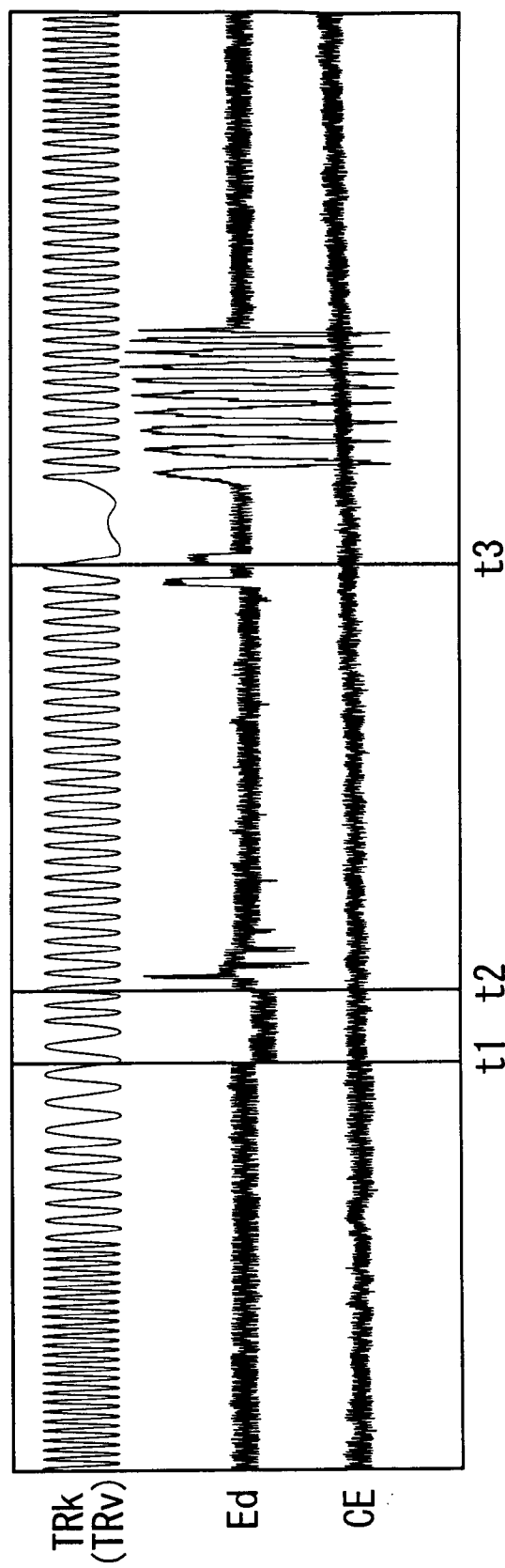
FIG. 14 shows a schematic view indicative of respective signals when pulling in the spot in case of the inner eccentricity.
Figure 15:
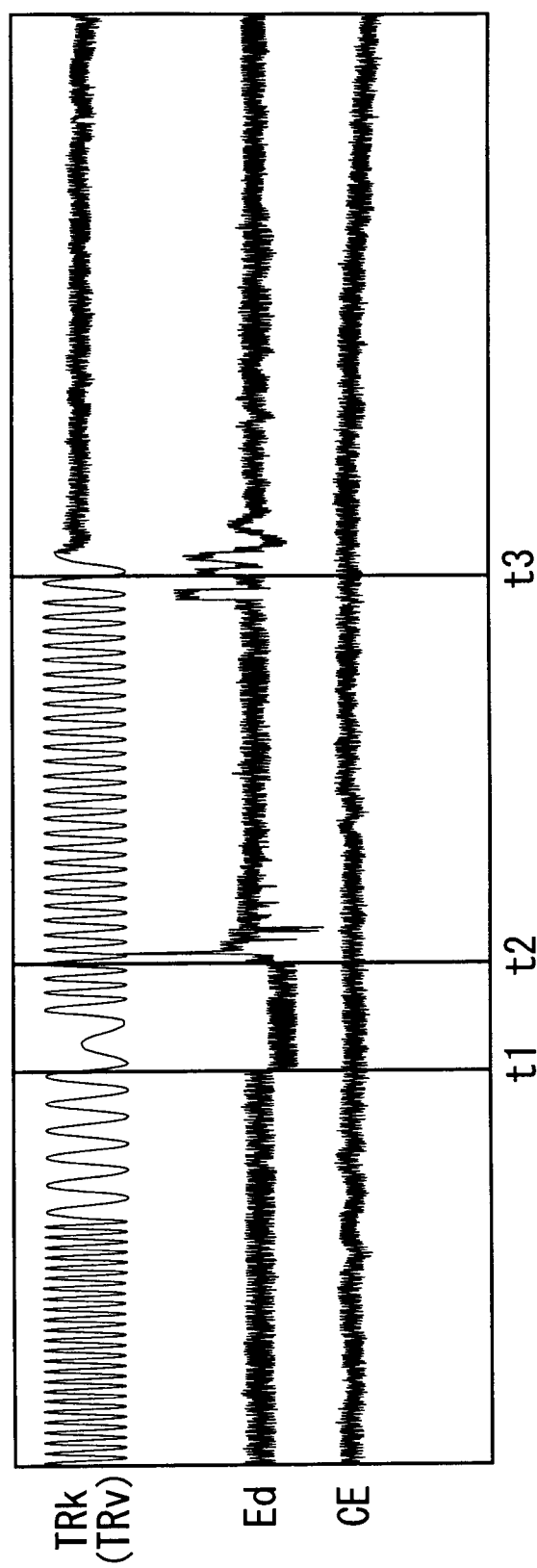
FIG. 15 shows a schematic view indicative of respective signals when pulling in the spot in case of the outer eccentricity.

FIG. 14 and FIG. 15 show waveforms obtained when enlarging the points near the position P1 and position P3. In FIG. 14 and FIG. 15, so as to avoid the steep change in the spot shift speed Spt at the time point t3, after reducing the speed of the spot shift speed Spt at the previous step of the speed reduction at the time point t3, the spot Pt is pulled in.

(4) Tracking Control Start Processing Procedure

Figure 16:
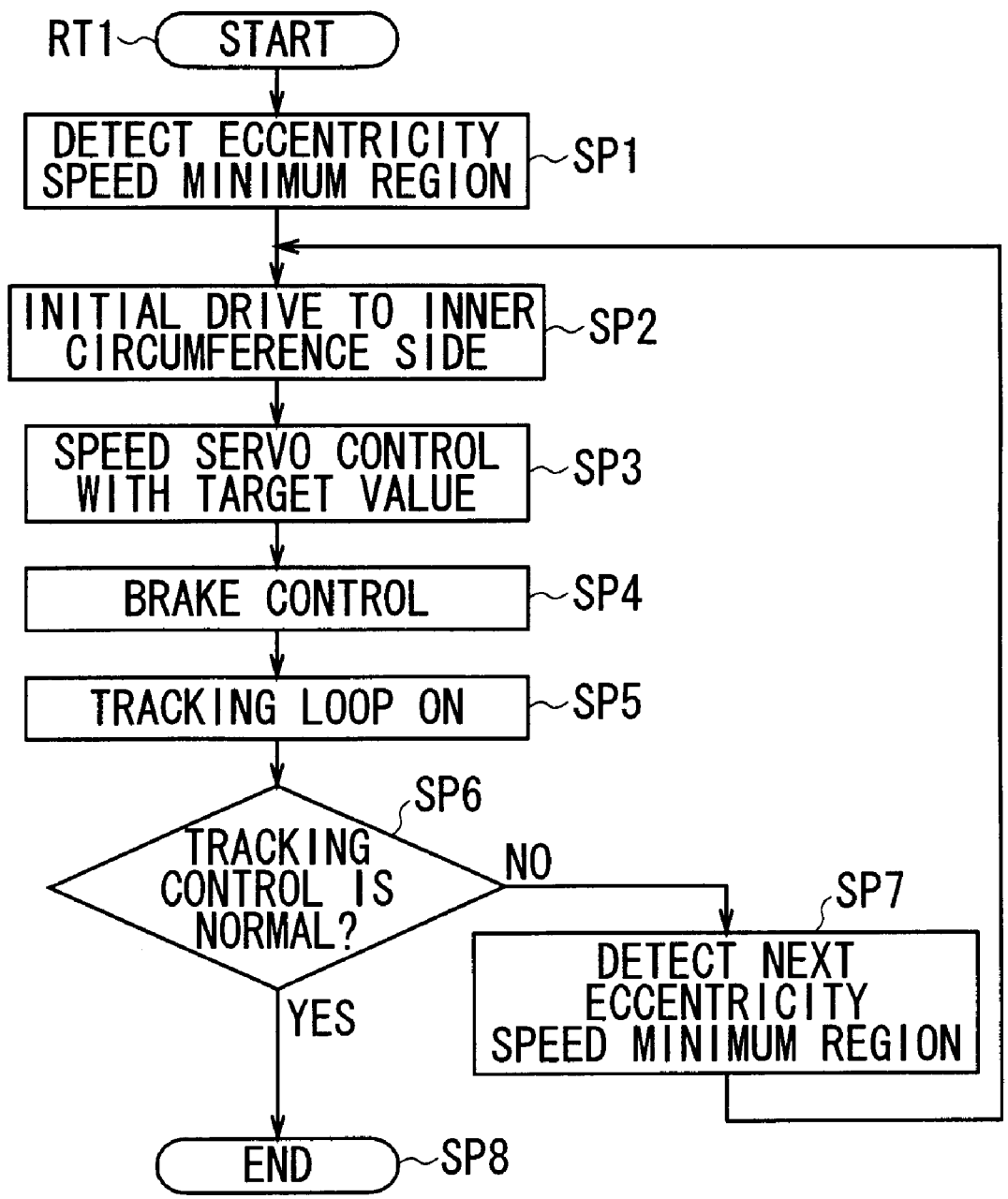
FIG. 16 shows a flow chart to explain the tracking control start processing procedure.

Next, a tracking control start processing procedure RT1 to be executed in accordance with a tracking control start program will be explained using a flow chart shown in FIG. 16.

When recognizing that the request to start the reproduction and record processing is sent from the user, the system controller 11 of the optical disc device 10 goes to step SP1 and shifts the spot Pt to a point near the target track TRt by driving the objective lens 31, and the seek control unit 11A detects the eccentricity speed minimum region AR (for example position P1), and goes to next step SP2.

In step SP2 (time point t1), the seek control unit 11A initially drives the objective lens 31 in the inner circumference side direction such that spot shift speed Spt becomes sufficiently larger than the track eccentricity speed Sba in the eccentricity speed minimum region AR1, going to step SP3.

In step SP3 (time point t2), the seek control unit 11A performs the speed servo control for the objective lens 31, and, by performing the speed reduction from the speed at the time of the initial drive, adjusts the speed for a predetermined track number such that the frequency in the traverse signal TRv comes to be the target speed "a" being a predetermined value, going to step SP4.

In step SP4 (time point t3), the seek control unit 11A detects the zero-cross point ZC−, and, by supplying the brake signal BK representing that a voltage opposite to that at the time of the initial drive is applied as the brake control to the drive control unit 13, reduces the speed of the spot shift speed Spt, going to step SP5.

In step SP5, the seek control unit 11A detects the next zero-cross point ZC− and sets the tracking loop 13A ON, and starts the tracking control, going to next step SP6.

In step SP6, the seek control unit 11A determines whether or the tracking control by the tracking loop 13A is normally started.

In case it is determined that the TR control error is raised, this indicates that the possibility that the eccentricity direction in the current eccentricity speed minimum region AR1 is inner eccentricity (for example, P1, P5) which is same as the initial drive direction is high, and the seek control unit 11A goes to the next step SP7.

In step SP7, when the seek control unit 11A detects the next eccentricity speed minimum region AR2 whose eccentricity direction is opposite, returning to the next step SP2, and keeps pulling in the spot Pt again.

On the other hand, in step SP6, in case it is determined that the tracking control is normally started, the seek control unit 11A goes to the next step SP8, and ends the processing.

(5) Operation and Effect

In above described configuration, when rotating the optical disc 100 with the objective lens 31 fixed, based on the cycle period of the traverse signal TRv which is brought about in the tracking error signal TRk when the spot Pt traverses the tracks TR due to the eccentricity of the optical disc 100, the optical disc device 10 detects the eccentricity speed minimum region AR1 being the first eccentricity speed minimum region in which the track eccentricity speed Sba with which the target track TRt draws away from the objective lens 31 is minimum.

Accordingly, since the optical disc device 10 can perform the tracking control start processing at a position where the relative speed between the spot Pt and tracks TR can be made small stably as the change amount of the track eccentricity speed Sba is small, the difficulty of pulling in the spot Pt can be lowered and the success rate of the tracking control starting processing can be improved.

Then, after driving the objective lens 31 in the inner circumference direction being a predetermined initial drive direction with an initial drive speed which is higher than the maximum track eccentricity speed Sba which is assumed for the spot Pt in the eccentricity speed minimum region AR1 by a target speed "α" being a predetermined value or more (that is, with a speed equal to or more than double the maximum track eccentricity speed Sba which is assumed in the eccentricity speed minimum region AR), the optical disc device 10 controls the objective lens 31 such that the relative speed between the track eccentricity speed Sba and the spot Pt comes to be the target speed "α" being a predetermined value.

Accordingly, with the spot shift speed Spt higher than the track eccentricity speed Sba, the optical disc device 10 can control the objective lens 31 such that the relative speed between the track eccentricity speed Sba and the spot Pt comes to be the target speed "α", and the zero-cross point ZC− shifting from the plus side to the minus side, which is the zero-cross point in a predetermined signal change state according to the initial drive direction, can be detected as the center of the groove G.

Furthermore, when detecting the zero-cross point ZC−, the optical disc device 10 determines that the spot Pt is located at the center of the groove G being the track center to reduce the speed of the objective lens 31, and sets the tracking loop 13A ON to operate the tracking control unit.

Accordingly, when the eccentricity direction of the optical disc 100 is the outer eccentricity, the optical disc device 10 can reduce the relative speed between the spot Pt and tracks TR to set up a condition in which the spot Pt can be pulled in easily onto the groove G, which can improve the success rate of the tracking control starting processing.

Then, the optical disc device 10 determines whether or not the control of the objective lens 31 by the tracking loop 13A is normally executed, and, in case the control is not normally performed, detects the eccentricity speed minimum region AR2 which is the second eccentricity speed minimum region provided with an eccentricity direction (outer eccentricity) that is opposite to an eccentricity direction (inner eccentricity) of the eccentricity speed minimum region AR1.

Accordingly, the optical disc device 10 can surely start the tracking control in pulling in the spot Pt at the second time, which can reduce a time period necessary in performing the tracking control start processing.

Furthermore, the optical disc device 10 determines whether or not the control of the objective lens 31 in the eccentricity speed minimum region AR1 is normally executed in a time period when the spot Pt shifts from the eccentricity speed minimum region AR1 to the next eccentricity speed minimum region AR2, which can make it possible to pull in the spot Pt for the second time in the next eccentricity speed minimum region AR2 and can minimize a time period consumed by the occurrence of the TR control error, thereby making it possible to start the tracking control promptly.

According to above-described configuration, after making it possible to discriminate the groove G and land L by the initial drive for the objective lens 31, the servo control and brake control are executed under an optimum condition when the objective lens 31 is initially driven to the inner circumference direction to be outer eccentricity where the spot Pt is easily pulled in so as to pull in the spot Pt and start tracking control, and, in case the TR control error is raised when pulling in the spot Pt in the eccentricity speed minimum region AR1 for the first time, assuming that the eccentricity speed minimum region AR1 is inner eccentricity, the spot Pt is pulled in at the next eccentricity speed minimum region AR2 in which the eccentricity direction becomes opposite and the tracking control is started, the possibility of normally starting the tracking control can be improved in pulling in the spot Pt for the second time, which can realize an optical disc device, a tracking control start method, and a tracking control start program which can promptly start the tracking control promptly.

(6) Other Embodiments

In the above-described embodiment, since the frequency of the traverse signal TRv becomes equal to or less than a detection threshold value for a predetermined number of times of detections, the eccentricity speed minimum region AR is detected based on the frequency of the traverse signal TRv, to which the present invention is not restricted, and, for example, as shown in FIG. 17A to FIG. 17C, there may be employed a configuration in which the traverse signal TRv is binarized to generate a traverse binarized signal, and a time period from the rise to the fall of the traverse binarized signal is counted, and furthermore, in pulling in the spot Pt at the second time or later, there may be employed a configuration in which a spindle control error signal of 18 pulses per rotation is used, and the pulse number is counted to detect it as the eccentricity speed minimum region AR. Furthermore, both the traverse binarized signal and spindle control error signal may be used.

In the above-described embodiment, at the time point t2, the objective lens 31 is driven such that the traverse signal TRv becomes the target speed "α" being a predetermined value that is substantially similar to the target speed "α" being the maximum track eccentricity speed Sba assumed as the eccentricity speed minimum region AR, to which the present invention is not restricted, and this predetermined value can be arbitrarily selected.

Furthermore, in the above-described embodiment, as the initial drive direction, the objective lens 31 is driven in the inner circumference direction, to which the present invention is not restricted, and the objective lens 31 may be driven in the outer circumference direction.

Moreover, in the above-described embodiment, in case the TR control error is raised in the eccentricity speed minimum region AR1, the next eccentricity speed minimum region AR2 is detected, to which the present invention is not restricted, and any eccentricity speed minimum region AR may be employed so long as the eccentricity direction is opposite to that of the eccentricity speed minimum region AR1, and for example, following third eccentricity speed minimum region AR4 may be detected.

Yet moreover, in the above-described embodiment, the determination that whether or not the control of the objective lens 31 in the eccentricity speed minimum region AR1 is normally performed is executed before the spot Pt shifts from the eccentricity speed minimum region AR1 to the eccentricity speed minimum region AR2, to which the present invention is not restricted, and, in case of detecting the following third eccentricity speed minimum region AR4, the determination may be executed before shifting to the eccentricity speed minimum region AR4. Furthermore, the determination method may be arbitrarily selected.

Yet moreover, in the above-described embodiment, the tracking control start processing is executed in the reproduction and record processing, to which the present invention is not restricted, and the tracking control start processing may be executed in case of restarting the tracking control which is suspended once when the track jump is performed or error due to the vibration is raised.

Yet moreover, in the above-described embodiment, the present invention is applied to the optical disc 100 of the BD system, to which the present invention is not restricted, and the present invention may be applied to the optical disc 100 of the HD, DVD (High Density Digital Versatile Disc, registered trademark) system.

Yet moreover, in the above-described embodiment, the optical disc device 10 provided with the record and reproduction function executes the tracking control start processing, to which the present invention is not restricted, and an effect similar to that of the embodiment can be obtained when an optical disc device provided with only the record function or reproduction function executes the tracking control start processing.

Yet moreover, in the above-described embodiment, the tracking control start program etc. is stored in the ROM in advance, to which the present invention is not restricted, and the program may be installed to the ROM from an external storage medium such as a memory stick (registered trademark of Sony Corporation). Furthermore, the tracking control start program etc. may be obtained from outside through a universal serial bus (USB) or a wireless local area network (LAN) such as the Ethernet (registered trademark) or IEEE (Institute of Electrical and Electronics Engineers) 802.11a/b/g.

Yet moreover, in the above-described embodiment, the optical disc device 10 as an optical disc device is configured by the seek control unit 11A as the minimum region detection unit, initial drive control unit, speed servo control unit, operation start unit, and tracking control possibility determination unit, to which the present invention is not restricted, and the optical disc device may be configured by a minimum region detection unit, initial drive control unit, speed servo control unit, operation start unit, and tracking control possibility determination unit of other various configurations.

The optical disc device, tracking control start method, and tracking control start program according to the embodiment of the present invention can be applied to an optical disc device which is mounted on various electronics.

It should be understood by those skilled in the art that various modifications, combinations, sub-combinations and alterations may occur depending on design requirements and other factors insofar as they are within the scope of the appended claims or the equivalents thereof.

What is claimed is:

1. An optical disc device that condenses an optical beam irradiated from a light source using an objective lens, and, when irradiating the optical beam to an optical disc as a spot, based on a tracking error signal representing a deviance amount of the spot from a track center of the optical disc, drives the objective lens such that the spot is shifted to a desired track using a tracking control unit, comprising:

a minimum region detection unit that detects a first eccentricity speed minimum region in which the eccentricity speed, with which the desired track departs from the objective lens, is minimum when the optical disc is rotated with the objective lens fixed, the minimum region detection unit detecting the first eccentricity speed minimum region based on a cycle period of a traverse signal which is derived from the tracking error signal and which represents track traversal by the spot due to the eccentricity of the optical disc; and a tracking control possibility determination unit that determines whether or not the control of the objective lens by the tracking control unit is normally executed after the spot is shifted to a track, and, in response to the control of the objective lens not being normally executed, controls the minimum region detection unit to detect a second eccentricity speed minimum region having an eccentricity direction which is opposite to an eccentricity direction of the first eccentricity speed minimum region.

2. The optical disc device according to claim 1, further comprising:

an initial drive control unit that drives the objective lens in a predetermined initial drive direction such that the spot is shifted with an initial drive speed faster than the eccentricity speed in the eccentricity speed minimum region;

wherein the initial drive control unit also drives the objective lens by the drive unit according to the second eccentricity speed minimum region, the second eccentricity speed minimum region being a region in which a shift direction of the optical disc is opposite to a shift direction of the objective lens.

3. The optical disc device according to claim 2, further comprising:

a speed servo control unit that controls the objective lens such that the relative speed of the eccentricity speed and the spot comes to be the predetermined value by reducing the speed of the objective lens from the initial drive speed.

4. The optical disc device according to claim 1 or 3, further comprising:

an operation start unit that, when detecting a zero-cross point in a predetermined signal change state according to the initial drive direction in the traverse signal, determines that the spot is located at the track center to reduce the speed of the objective lens, and operates the tracking control unit.

5. The optical disc device according to claim 1, wherein the tracking control possibility determination unit determines whether or not the control of the objective lens is normally executed in the first eccentricity speed minimum region in a time period before the spot shifts from the first eccentricity speed minimum region to the next eccentricity speed minimum region.

6. The optical disc device according to claim 2, wherein the tracking control possibility determination unit makes the minimum region detection unit detect the next eccentricity speed minimum region as the second eccentricity speed minimum region.

7. A tracking control start method with respect to an optical disc device that condenses an optical beam irradiated from a light source using an objective lens, and, when irradiating the optical beam to an optical disc as a spot, based on a tracking error signal representing a deviance amount of the spot from a track center of the optical disc, drives the objective lens such that the spot is shifted to a desired track using a tracking control unit, comprising:

detecting a first eccentricity speed minimum region in which the eccentricity speed, with which the desired track departs from the objective lens, is minimum when the optical disc is rotated with the objective lens fixed, the minimum region detection unit detecting the first eccentricity speed minimum region based on a cycle period of a traverse signal which is derived from the tracking error signal and which represents track traversal by the spot due to the eccentricity of the optical disc; and determining whether or not the control of the objective lens by the tracking control unit is normally executed after the spot is shifted to a track, and, in response to the control of the objective lens not being normally executed, controls the minimum region detection unit to detect a second eccentricity speed minimum region having an eccentricity direction which is opposite to an eccentricity direction of the first eccentricity speed minimum region.

8. A non-transitory computer readable medium having stored thereon a tracking control start program that when executed by a computer causes the computer to perform a method using an optical disc device that condenses an optical beam irradiated from a light source using an objective lens, and, when irradiating the optical beam to an optical disc as a spot, based on a tracking error signal representing deviance amount of the spot from a track center of the optical disc, drives the objective lens such that the spot is shifted to a desired track using a tracking control unit, the method comprising:

detecting a first eccentricity speed minimum region in which the eccentricity speed, with which the desired track departs from the objective lens, is minimum when the optical disc is rotated with the objective lens fixed, the minimum region detection unit detecting the first eccentricity speed minimum region based on a cycle period of a traverse signal which is derived from the tracking error signal and which represents track traversal by the spot due to the eccentricity of the optical disc; and determining whether or not the control of the objective lens by the tracking control unit is normally executed after the spot is shifted to a track, and, in response to the control of the objective lens not being normally executed, controls the minimum region detection unit to detect a second eccentricity speed minimum region having an eccentricity direction which is opposite to an eccentricity direction of the first eccentricity speed minimum region.

* * * * *